US011244509B2

(12) United States Patent
Friesenhahn et al.

(10) Patent No.: US 11,244,509 B2
(45) Date of Patent: Feb. 8, 2022

(54) DRIFT CORRECTION FOR INDUSTRIAL AUGMENTED REALITY APPLICATIONS

(71) Applicant: FISHER-ROSEMOUNT SYSTEMS, INC., Round Rock, TX (US)

(72) Inventors: Joshua Sanders Friesenhahn, Round Rock, TX (US); James Aaron Crews, Cedar Park, TX (US); Trevor Duncan Schleiss, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 16/105,249

(22) Filed: Aug. 20, 2018

(65) Prior Publication Data

US 2020/0058169 A1 Feb. 20, 2020

(51) Int. Cl.
*G06T 19/00* (2011.01)
*G01C 21/16* (2006.01)
(Continued)

(52) U.S. Cl.
CPC .......... *G06T 19/006* (2013.01); *G01C 21/165* (2013.01); *G06K 9/00671* (2013.01);
(Continued)

(58) Field of Classification Search
None
See application file for complete search history.

(56) References Cited

U.S. PATENT DOCUMENTS

| 8,509,483 B2 | 8/2013 | Lawrence Ashok Inigo |
| 9,147,221 B2 | 9/2015 | Grasset et al. |

(Continued)

FOREIGN PATENT DOCUMENTS

| WO | WO-2014/074837 A1 | 5/2014 |
| WO | WO-2016/157193 A1 | 10/2016 |
| WO | WO-2017/201282 A1 | 11/2017 |

OTHER PUBLICATIONS

Biz Carson, "I Tried on the Smart Helmet From the Future and it Gave me Super Powers", Apr. 16, 2016, http://www.businessinsider.com/what-is-the-daqri-smart-helmet-2016-4, retrieved from the internet on Jul. 16, 2018, 5 pages.

(Continued)

*Primary Examiner* — Yanna Wu
(74) *Attorney, Agent, or Firm* — Marshall, Gerstein & Borun LLP

(57) ABSTRACT

In a method for increasing accuracy of augmented reality information presented to a user navigating a real-world mapped environment, a specific object within a field of view of a camera of the user's mobile device is identified, at least by predicting an object type by a machine learning model processing images captured by the camera, and identifying a node that corresponds to the object type within a map database representing the mapped environment. A location associated with the node is retrieved from the map database, and is used to update or confirm one or more estimated locations of the mobile device. Digital information is caused to be superimposed on a real-world view presented to the user via a display of the mobile device, the digital information being selected based at least in part on the updated or confirmed one or more estimated locations of the mobile device.

17 Claims, 18 Drawing Sheets

(51) Int. Cl.
*G06K 9/00* (2006.01)
*G06T 7/73* (2017.01)
*G06T 7/50* (2017.01)
*G06T 17/05* (2011.01)

(52) U.S. Cl.
CPC .............. *G06T 7/50* (2017.01); *G06T 7/74* (2017.01); *G06T 17/05* (2013.01); *G06T 19/003* (2013.01); *G06T 2200/24* (2013.01); *G06T 2207/20081* (2013.01); *G06T 2207/20084* (2013.01)

(56) References Cited

U.S. PATENT DOCUMENTS

| | | | |
|---|---|---|---|
| 9,489,635 | B1 * | 11/2016 | Zhu .................... G06K 9/00805 |
| 9,754,167 | B1 | 9/2017 | Holz et al. |
| 9,761,057 | B2 | 9/2017 | Salter et al. |
| 2002/0107673 | A1 | 8/2002 | Haller et al. |
| 2004/0181548 | A1 | 9/2004 | Thomas et al. |
| 2006/0241792 | A1 | 10/2006 | Pretlove et al. |
| 2007/0273557 | A1 | 11/2007 | Baillot |
| 2008/0100570 | A1 | 5/2008 | Friedrich et al. |
| 2009/0322671 | A1 | 12/2009 | Scott et al. |
| 2010/0287485 | A1 * | 11/2010 | Bertolami ............... G06F 3/011 715/764 |
| 2012/0251996 | A1 * | 10/2012 | Jung .................. G05B 19/4183 434/365 |
| 2012/0306850 | A1 | 12/2012 | Balan et al. |
| 2013/0083173 | A1 | 4/2013 | Geisner et al. |
| 2013/0301875 | A1 | 11/2013 | Schumacher |
| 2014/0063055 | A1 | 3/2014 | Osterhout et al. |
| 2014/0118536 | A1 | 5/2014 | Morin et al. |
| 2014/0210947 | A1 | 7/2014 | Finn et al. |
| 2014/0267234 | A1 | 9/2014 | Hook et al. |
| 2014/0302915 | A1 | 10/2014 | Lyons et al. |
| 2014/0368532 | A1 | 12/2014 | Keane et al. |
| 2015/0024710 | A1 * | 1/2015 | Becker .................. H04W 12/06 455/411 |
| 2015/0062123 | A1 | 3/2015 | Yuen |
| 2015/0153181 | A1 | 6/2015 | Gildfind et al. |
| 2015/0161821 | A1 | 6/2015 | Mazula |
| 2015/0169597 | A1 * | 6/2015 | Edge .................. G06F 16/9537 707/751 |
| 2015/0196101 | A1 | 7/2015 | Dayal et al. |
| 2015/0279112 | A1 | 10/2015 | Meftah et al. |
| 2015/0350378 | A1 * | 12/2015 | Hertel ..................... H04L 67/42 709/203 |
| 2016/0140868 | A1 | 5/2016 | Lovett et al. |
| 2016/0284128 | A1 | 9/2016 | Michalscheck et al. |
| 2017/0013409 | A1 * | 1/2017 | Cerchio ............... G01C 25/005 |
| 2017/0046877 | A1 | 2/2017 | Hustad et al. |
| 2017/0124396 | A1 | 5/2017 | Todeschini et al. |
| 2017/0270715 | A1 | 9/2017 | Lindsay et al. |
| 2018/0365495 | A1 | 12/2018 | Laycock et al. |
| 2019/0096132 | A1 | 3/2019 | Crews et al. |
| 2019/0096133 | A1 | 3/2019 | Crews et al. |
| 2019/0139323 | A1 | 5/2019 | Dearman et al. |

OTHER PUBLICATIONS

Jessica Dolcourt, "Heads-on With a Smart Helmet That's Named After a Delicious Drink", Jan. 6, 2016, https://www.cnet.com/products/daqri-smart-helmet/preview/, retrieved from the internet on Jul. 16, 2018, 2 pages.

Jenna McKnight, "Daqri's Augmented-reality Construction Helmet Aims to Change the Nature of Work", Jan. 27, 2016, Dezeen, https://www.dezeen.com/2016/01/27/daqri-smart-construction-helmet-augmented-reality- . . . , retrieved from the internet on Jul. 16, 2018, 4 pages.

"A Robot With a View—How Drones and Machines Can Navigate on Their Own", Dec. 16, 2015, https://www.qualcomm.com/news/onq/2015/12/16/robot-view-how-drones-and-machines- . . . , retrieved from the internet on Jul. 16, 2018, 3 pages.

Search Report for Great Britain Application No. 1910902.4, dated Jan. 29, 2020.

"How Augmented Reality Can Be Applied to Home Automation," (2017). Retrieved from the Internet at: URL:https://enlight.tech/2017/05/03/augmented-reality-can-applied-home-automation/.

Biz Carson, "I Tried on the Smart Helmet From the Future and it Gave me Super Powers", http://www.businessinsider.com/what-is-the-daqri-smart-helmet-2016-4, retrieved from the internet on Jul. 16, 2018, 5 pages.

Henderson et al., "Evaluating the Benefits of Augmented Reality for Task Localization in Maintenance of an Armored Personnel Carrier Turret," Mixed and Augmented Reality, pp. 135-144 (2009).

International Search Report and Written Opinion for Application No. PCT/US2018/052894, dated Dec. 4, 2018.

International Search Report and Written Opinion for Application No. PCT/US2018/052897, dated Dec. 4, 2018.

Jayaweera et al., "Demo Abstarct: Enhanced Real-Time Machine Inspection with Mobile Augmented Reality for Maintenance and Repair," IEEE ACM Second International Conference on Internet-of-Things Design and Implementation, pp. 287-288 (2017).

Ke et al., "An Augmented Reality-Based Application for Equipment Maintenance," Affective Computing and Intelligent Interaction Lecture Notes in Computer Science, pp. 836-841 (2005).

Search Report for Application No. GB1814200.0, dated Feb. 27, 2019.

Examination Report for Application No. GB2004546.4, dated Oct. 20, 2021.

Examination Report for Application No. GB2004547.2, dated Oct. 20, 2021.

* cited by examiner

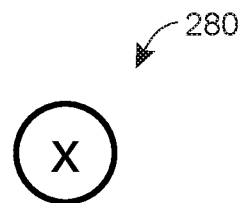
FIG. 4E
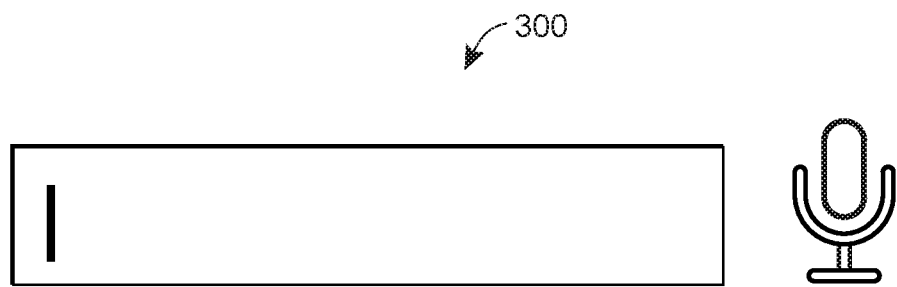
FIG. 4F

420 →

Experience Webservice
Address = /ShowText
Arguments = NodeID, RoleID
Returns = <Text> object

| TextExperience |
|---|
| PK NodeID (Integer) |
| PK RoleID (Integer) |
| ExperienceText (String) |
| ExperienceStyle (String) |

Experience Webservice
Address = /LoadURL
Arguments = NodeID, RoleID
Returns = <URL> object

| URLExperience |
|---|
| PK NodeID (Integer) |
| PK RoleID (Integer) |
| ExperienceURL (String) |

Experience Webservice
Address = /GetOPCDA
Arguments = NodeID, RoleID
Returns = <OPCTag> objects

| GetOPCDA |
|---|
| PK NodeID (Integer) |
| PK RoleID (Integer) |
| OPCTagList (String) |
| OPCValueAliases (String) |

FIG. 5B

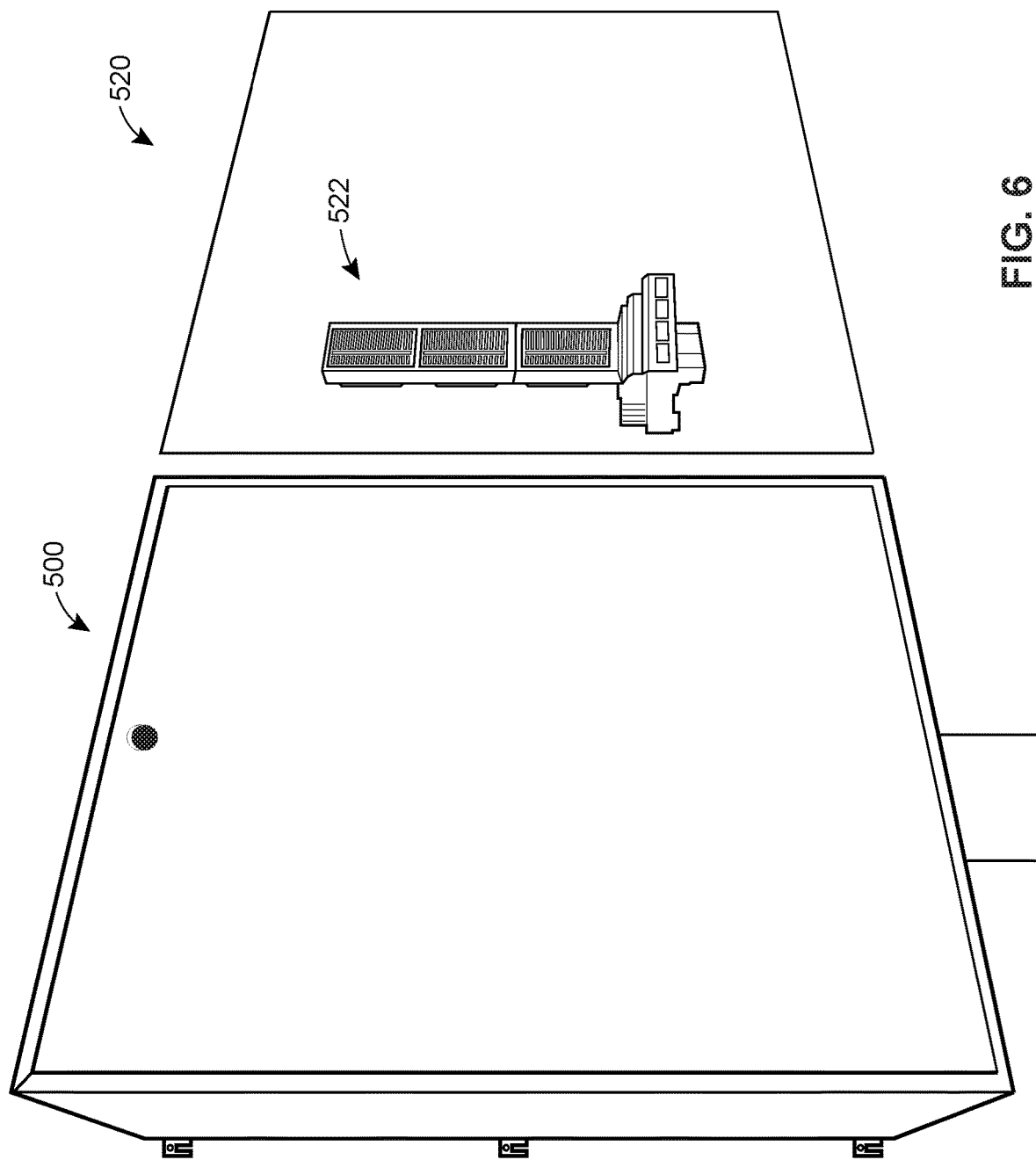

DRIFT CORRECTION FOR INDUSTRIAL AUGMENTED REALITY APPLICATIONS

TECHNICAL FIELD

The present disclosure relates generally to augmented reality technology, and, more particularly, to an augmented reality platform that may be utilized in process control or other environments.

BACKGROUND

Augmented reality (AR) systems that provide for the overlay of digital information (e.g., text, images, animation, etc.) on real-world environments, are becoming increasingly common as new applications for the technology are explored. AR systems typically provide information that is specific to the context of the user's current real-world surroundings. For such systems, real-world knowledge is generally required, such as knowledge of physical things that are currently in a user's view, and the physical layout at and around the current location of the user. To make this sort of information available to the AR system, a three-dimensional (3D) digital model representing the user's environment and the objects therein is typically created. The 3D model may then be augmented with particular types of data (e.g., descriptions), graphics (e.g., icons), etc., relating to particular locations and/or particular objects in the environment. When a user equipped with the appropriate AR gear moves through the mapped environment, the augmented portions can be rendered/displayed to the user, by overlaying digital information on the user's real-world view (e.g., a real-time camera view, or as a heads up display (HUD) through which the user observes the environment) without rendering/displaying the rest of the 3D model.

Conventionally, 3D models of this sort are manually constructed by human designers, and/or using a 3D scanner. Both of these approaches, however, can be very time- and labor-intensive for applications involving environments having complex layouts and/or a large number of objects. Moreover, any changes to the environment (e.g., as objects are moved or replaced/updated within the environment) can require that the entire modeling process be repeated, or other time- and labor-intensive procedures.

Current AR systems can suffer from other drawbacks as well. When used in relatively dense environments (e.g., environments having multiple objects that are in close proximity and/or have a large amount of information to display in the AR view), for example, AR systems may subject users to a vast amount of information that could easily lead to sensory overload, and/or the user may not easily perceive the context of all the information. Moreover, some objects may be obscured within the AR view. For example, objects may be located within an enclosure, or may reside at an inaccessible or inconvenient (e.g., distant) location.

Solutions to these problems may be provided by various aspects of an augmented reality platform that is described and shown in U.S. Provisional Patent Application No. 62/564,074 (filed on Sep. 27, 2017 and entitled "Augmented Reality Platform"), the disclosure of which is hereby incorporated herein by reference in its entirety. The augmented reality platform generally relies on location tracking of a user's mobile device (e.g., a smartphone, a tablet, a dedicated AR helmet or other gear, etc.) relative to a "landmark" or reference location at which a user "checks in." For example, user location may be tracked using an inertial measurement unit of the user's mobile device as he or she moves about the process control or other environment. Over time, however, the user's apparent location may "drift" relative to the reference point due to the cumulative effect of small inaccuracies in the user's tracked location.

The problems this creates may be two-fold. First, in implementations where such location tracking is used to generate the model of the environment (e.g., a process control environment), any locations fed into the model (e.g., locations of equipment and/or other objects) may be inaccurate. Second, if such location tracking is subsequently used by those navigating the mapped environment, the system may present AR information to users based on incorrect location information (e.g., by failing to recognize that the user is near a particular object, or erroneously determining that the user is near a different object, etc.). Thus, the utility of the augmented reality platform may be greatly diminished (e.g., by limiting the size of the plant or other area in which the platform may be effectively used), and/or made more cumbersome (e.g., by requiring a recalibration procedure in which users periodically check back in at a landmark location).

SUMMARY

Techniques, systems, apparatuses, and methods for providing an augmented reality experience are disclosed herein. Said techniques, systems, apparatuses, and methods may apply to industrial process control systems, environments, and/or plants, for example, which may interchangeably be referred to herein as "process control" or "process" systems, environments, and/or plants. Typically, such systems and plants provide control, in a distributed manner, of one or more processes that operate to manufacture, refine, or otherwise transform raw physical materials to generate or produce products. In some embodiments, however, the techniques, systems, apparatuses, and methods described herein may be used in other types of environments, and/or used in a context other than augmented reality (e.g., in a virtual reality (VR) context).

Generally, process control environments can give rise to many of the various difficulties, discussed above in the "Background" section, that are associated with generating and using a conventional augmented reality (AR) system or platform. For example, such environments often contain a large number of diverse objects (e.g., tanks, pumps, valves, motors, transmitters, etc.) that are in close proximity and/or are associated with large amounts of information (e.g., sensor readings, diagnostic status, etc.). Moreover, those objects may be frequently moved or replaced.

An AR platform described herein may overcome or ameliorate some or all of these difficulties, and therefore may be well-suited for use in process control environments. With the AR platform, a three-dimensional (3D) model is generated by a user employing an AR mobile device. The AR mobile device may be an AR helmet, an AR head set, AR goggles, smart glasses, a smartphone, a tablet, or any other suitable type of mobile device that is capable of supporting location tracking (as discussed below) and can present an AR experience to a user.

The 3D model indicates 3D locations/positions of points of interest, within the process control environment, that correspond to different real-world objects (e.g., field devices, tanks, conveyors, controllers, switches, etc.). Objects that are added to the 3D model are referred to herein as "nodes" of the AR platform or system. As the term is used herein, an "object" (also referred to as a "real-world object")

may be any physical thing (e.g., a device, component, equipment, structure, etc.), portion of a thing (e.g., an element of a device or component, etc.), or combination of things (e.g., a group of related devices or components, etc.). In a process control environment, for example, an object may be a field device (e.g., valve, pump, sensor, etc.), piece of equipment (e.g., a conveyor, tank, etc.), process controller, switch, and so on.

In some implementations, when an AR application is launched on an AR mobile device (e.g., when specifically activated by the user, or upon device power-up), the user "checks in" or registers the AR mobile device at some reference or "landmark" location. For example, the user may scan a QR code, or another visual representation of a code/identifier, at the landmark location with a camera of the AR mobile device. The act of scanning the code may establish a starting location for the user/device (e.g., the coordinates {0,0,0} in an {x,y,z} space).

After registration, the user may begin to physically move through the process control environment with the AR mobile device. Suitable positioning technology (e.g., provided by the user's AR mobile device) may be used to track the user's movement through the process plant. Because GPS or GNSS units may not function well in many process plant environments and cannot provide orientation data or accurate elevation data (especially for process control environments that are indoors), other positioning and/or orientation technologies may be used. For example, the location of the AR mobile device relative to the landmark location, and the orientation of the AR mobile device (e.g., the direction of a field of view of a camera of the AR mobile device, which may correspond to the direction the user is facing), may be tracked using a fusion of inertial measurement unit (IMU) data (e.g., generated by accelerometers, gyroscopes, etc.) and camera image data. In one implementation, for example, the Visual-Inertial Odometry (VIO) technique developed by Qualcomm® is employed to track position and orientation.

When arriving at or near a real-world object that is to be added as a node, and while facing in the direction of the object (e.g., if wearing an AR helmet or goggles) or otherwise pointing the device camera at the object (e.g., if the device is a tablet or smartphone), the user may select an option to add a new node. For example, the AR mobile device may recognize the voice command "add node" when spoken by the user, or (e.g., if the device is a tablet or smartphone) the AR mobile device may allow the user to select an "Add Node" or similar option/control on a graphic user interface (GUI) of the AR mobile device display. The AR mobile device may then capture an image of the object, and process the image to estimate a distance between the AR mobile device and the object. Alternatively, other sensors (e.g., lidar, radar, etc.) may be used to determine the distance between the AR mobile device and the object. The AR mobile device may then determine the position of the object relative to the landmark location based on the current position and orientation of the AR mobile device, as well as the distance between the AR mobile device and the object. Alternatively, a remote server or other computing device/system may process image data captured by the AR mobile device to determine the object position relative to the landmark location.

The user may also specify the name or type of the new node (e.g., valve, pump, etc.) and/or other information (e.g., a model number or other identifier for the object, a short description of the object, etc.). The specified information may then be associated with the new node in a back-end database of the AR system. The back-end database may contain a library of nodes added by the user (and possibly other users as well), with associated 3D locations relative to the landmark location, to collectively establish a virtual, 3D "map" of objects/assets in the process control environment. The database may also store other node information, such as lists of related and/or connected nodes, for example.

After at least one object of interest in a particular process control environment has been mapped (i.e., added to the node library using an AR mobile device), any users who register their AR mobile devices at the landmark location (including the mapping user(s)) may take an augmented tour of the process control environment. When a user with a registered AR mobile device directs a field of view of a camera of the AR mobile device towards an area that includes a particular real-world object (e.g., if the user looks at the area while wearing an AR helmet or goggles), and if the object is already associated with a node in the node library, the AR mobile device may augment the real-world scene observed by the user with a node "marker" (e.g., text, an icon, a graphic, etc.) that appears to the user as if it were located at or near the coordinates of the object in the user's real-world view.

If the user selects a particular node (e.g., by focusing on the node marker, or issuing a voice command, etc.), the AR mobile device may make one or more "node experiences" available to the user. For example, one node experience may superimpose text (node name, description, etc.), tables, and/or graphics/icons on the real-world view of the user. Other node experiences may superimpose web content from a particular URL (e.g., an instructional or "help" video), or may superimpose visualizations of physical or logical connections to, and/or relationships with, other objects/nodes, for example. Still other node experiences may include retrieving a work order associated with the object/node, establishing a communication link between the user and an appropriate expert at a remote location, and so on. In some implementations, at least one node experience launches (or links to) one or more other software applications or systems, in the specific context of the object that is being observed by the user. For example, the AR mobile device may superimpose sensor data, status, and/or virtual controls for a selected object/node (e.g., a field device) in the field of view, where the data is received from (and user inputs to the controls are transmitted to) a different application.

The experiences available to a user for a given node, the type of content presented within a particular node experience, and/or, in some implementations, whether any augmented information at all is available to a particular user for a given node, may be determined based at least in part on the user's "role." For example, a particular user may use the AR mobile device to select an "operator" role, a "maintainer" role, or an "engineer" role, or may be pre-assigned such a role.

In some implementations, visual information captured by a camera of the user's AR mobile device may be used to correct for "drift" in location tracking. To this end, a machine learning (ML) model may be trained to recognize/identify objects within the images, such as specific types of equipment or other assets within a process control (or other) environment. The ML model may be trained using manually labeled/classified images of objects and a supervised learning technique, for example. As a user moves about the plant or other environment, the camera of his or her AR mobile device may capture images, and the AR mobile device may feed those images to the ML model (e.g., by transmitting the images to a server, or by utilizing a locally-stored ML model). The ML model may then process the images to predict which known type(s) of object(s), if any, are within the camera's field of view.

In some implementations, drift correction may be used to avoid or reduce manual recalibration procedures as a user navigates a previously-mapped area, and/or to increase the area over which an AR user can move with adequate tracking accuracy. In such implementations, the object type(s) predicted by the ML model may be cross-referenced with one or more nodes in the back-end database to identify the unique node (e.g., tag name, etc.) corresponding to the object the user is seeing in his or her field of view. The previously-mapped location of the identified node(s) may then be retrieved from the back-end database, and used by the AR system to automatically recalibrate the user's location within the environment. In effect, this may allow each mapped object to serve as a sort of landmark in itself (e.g., as a part of a "mesh" network of landmarks). The resulting, enhanced location accuracy may enable a more appropriate/accurate set or sequence of AR visualizations within the user's field of view as he or she continues to move. Optionally, the visual information captured by AR mobile device cameras may be used over time, in conjunction with known object type information stored in the back-end database (and/or in conjunction with manual object classifications or confirmations made by a mapping user), to further train and refine the ability of the ML model to accurately recognize object types.

Alternatively, or in addition, the ML model may be used to facilitate the initial generation of the 3D map, and/or to update the 3D map (as represented in the back-end server) over time for greater accuracy. For example, predictions made by the ML model may be used to provide a mapping user with one or more suggestions as to how to label/classify a particular object/node that the user is adding to the 3D map (e.g., by providing an object descriptor, or candidate object descriptors, that appear(s) in a list on the user's AR display, or by automatically populating a descriptor field with the predicted object type, etc.). As another example, tracked locations of a number of users who navigate an already-mapped environment may be used to automatically update the locations of mapped objects/nodes (e.g., if an ML model recognizes a specific object at a location that differs slightly from the location of that object as stored in a map database) on an ongoing basis.

A number of other features may be provided to users as well. In some implementations, for example, virtual "x-ray vision" may be provided to users by creating hyper-realistic or pseudo-realistic 3D model visualizations that, when superimposed on the real-world view of the user, may appear as if the user were seeing objects hidden within enclosures (e.g., within a cabinet) or behind barriers. The AR mobile device may also present the user with (and/or enable the user to select) certain node experiences associated with hidden objects, such as viewing status data or alerts associated with the hidden objects, issuing voice commands to control operation of the hidden objects, and so on.

As another example, the AR mobile device may superimpose an "avatar" of a limited-access and/or distant object/node on the user's real-world view. The object may be at the top of a high tower, for example, or in a toxic or high-voltage area, etc. As with the hidden objects, the user may be provided with certain node experiences that provide various kinds of interactions with the limited-access and/or distant object. In both the hidden object ("x-ray vision") and the limited-access/distant object implementations/scenarios, users may be provided with an overall experience that is quite similar to having the object/node be right in front of, and plainly visible to, the user while the user interacts with the object.

Other types of functionality may also be supported by the AR platform. For example, current positions of users may trigger various alerts (e.g., a warning that the user is in a dangerous area) and/or or other displays of information. As another example, current and/or historical 3D positions of users within a process plant may be tracked/recorded for various purposes, such as ensuring employee evacuation in an emergency situation, ensuring that employees are not injured or otherwise in need of medical help, or monitoring training of certain employees.

The AR platform described above and further below may provide a number of advantages, depending on the specific implementation. By mapping only the relative 3D positions of certain objects, for example, the 3D model may be generated more easily and efficiently than with conventional means (e.g., using a 3D scanner to map the environment). Likewise, updates or reconfigurations of objects within the process control environment may be performed more quickly and easily. Moreover, by using the mapping process described herein, and by tracking the movement of AR mobile devices/users as described herein, the AR platform may determine when to provide augmented information to a user without requiring the expense and/or time of retrofitting, or otherwise equipping, objects with short-range communication technologies (e.g., Bluetooth or near-field communications (NFC) units), and without requiring time-consuming actions by users navigating the environment (e.g., scanning QR codes on objects, manual data entry of object identifiers, physically connecting to objects, etc.). Thus, conventional barriers to the deployment of an AR system, particularly in a process control environment, may be lessened or removed.

As another example, the AR platform may generally provide a marketplace in which third parties can offer new, customized types or classes of "node experiences" that correspond to different user interactions with objects/nodes, and/or can offer new content for existing node experiences. Instrumentation vendors or other entities may offer subscriptions to "help" information, or AR- or video-based work instructions for particular objects, for example. In some embodiments, a virtual "app store" may allow customers to license various applications, and/or subscribe to specific types of content that are desired for a customer's mobile workforce.

Furthermore, the features facilitating display/viewing of augmented information for obscured, distant and/or limited-access nodes may save a user's time (and therefore costs) and, in some implementations and/or scenarios, may improve worker safety by avoiding the need to visit dangerous areas.

Still further, the AR platform architecture may be highly flexible. The AR platform may facilitate the display of relevant information to users on a variety of different platforms, for example, such as smart helmets, smart goggles, smart phones, tablets, etc. The AR platform may also facilitate interactivity with a number of other software applications (e.g., process control software that is able to retrieve data indicative of control logic, device readings, etc.), and/or allow new experiences, content, or other functionality to be easily provided.

Still further, the learning-based object recognition techniques described above may be used to enable presentation of a more accurate AR experience, to increase the area over which a user may roam without unacceptable losses in accuracy, to prevent or reduce the need for "checking in" at landmarks, to facilitate and/or hasten the creation of a map of an object-filled environment, and/or to update or increase the accuracy of an existing map of an object-filled environment.

As noted above, certain implementations and/or features described herein need not be used in an AR system, and/or need not be used in a process control environment. For example, a user with a smartphone, tablet or other mobile device may be presented with "node experiences" based on the mapped 3D positions of objects within a plant and the user's current position and orientation, without necessarily providing those experiences as an AR display (e.g., using a virtual reality display or simply a GUI). As another example, the techniques described herein may be applied in environments other than process control environments, such as in office spaces, warehouses, hospitals, and so on.

BRIEF DESCRIPTION OF THE DRAWINGS

FIGS. 4A through 4H depict example user interfaces that may be superimposed over a field of view provided by an AR mobile device.

FIGS. 5A and 5B depict example elements of a database that may be used in the AR platform.

FIG. 6 depicts an example embodiment and scenario in which a user of an AR mobile device is provided with virtual x-ray vision.

DETAILED DESCRIPTION

Example Augmented Reality System

Figure 1:
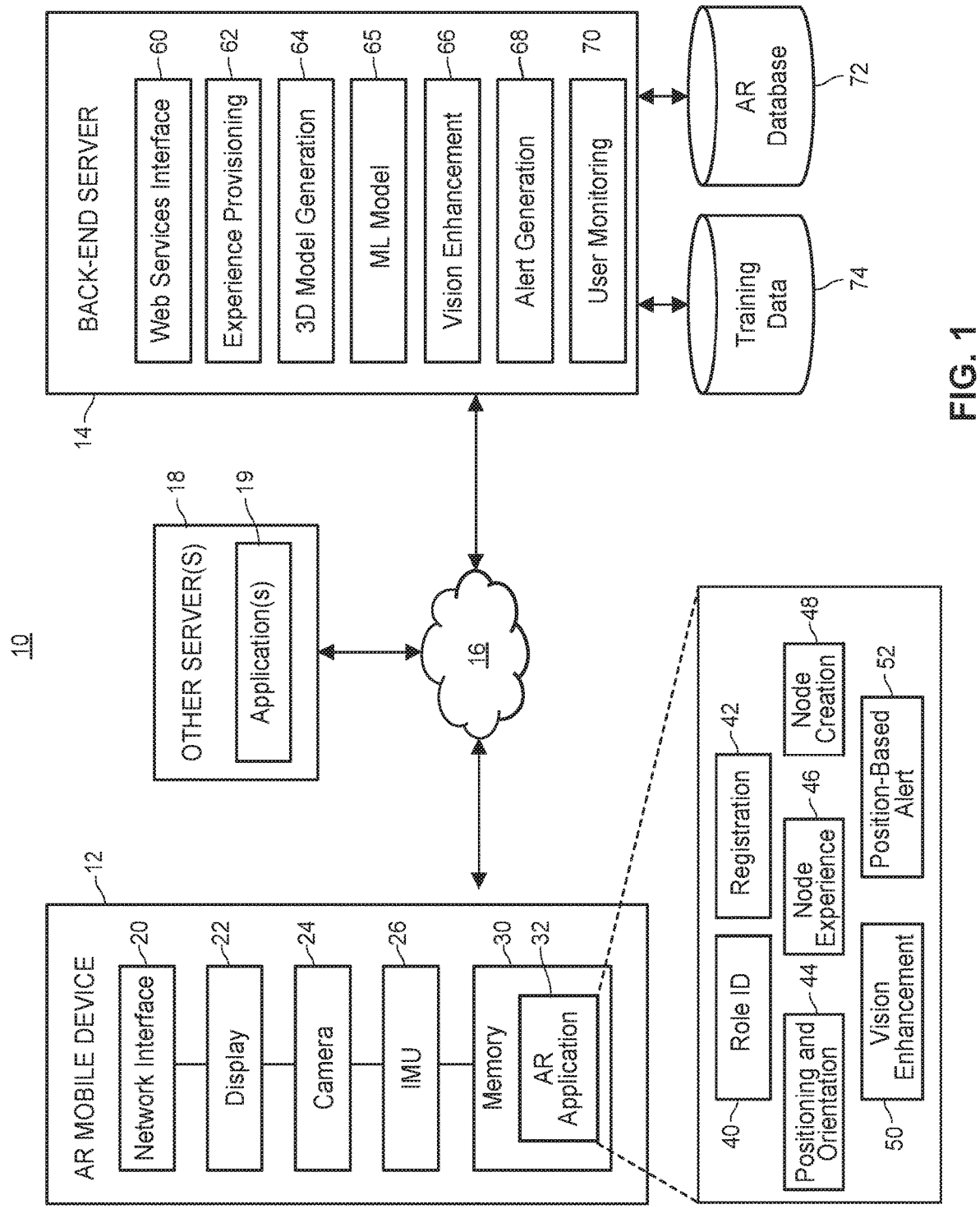
FIG. 1 is a block diagram depicting an example augmented reality (AR) system, which provides an AR platform that may support various methods, techniques, functions and/or features described herein.

FIG. 1 depicts an example augmented reality (AR) system 10 that may generally provide an AR platform for providing an AR experience in an environment (e.g., a process control environment). The AR system 10 includes an AR mobile device 12 of a user, and a back-end server 14 that may be communicatively coupled to the AR mobile device 12 via a network 16. The AR mobile device 12 may be any computing device having suitable processing and sensing capabilities and capable of being worn or otherwise carried by a user. For example, the AR mobile device 12 may be a device specifically configured for AR, such as an AR helmet (e.g., the Smart Helmet® developed by DAQRI®) or AR goggles. Alternatively, the AR mobile device 12 may be a device that also has non-AR applications (e.g., a tablet, smartphone, smart glasses, smart watch, etc.), but executes a software application that configures the device 12 to have AR capabilities. While FIG. 1 depicts only one AR mobile device 12, it is understood that a larger number of AR mobile devices, identical to or different than the AR mobile device 12, may be used in the AR system 10 in a similar manner.

The AR mobile device 12 is generally configured to provide an AR experience to the user, by augmenting the user's real-world view with contextual information (e.g., text, graphics, animations, etc.). The back-end server 14 generally supports the AR experience for the user, and for the users of other AR mobile devices, by managing data specifying how a user's real-world view should be augmented in particular situations, by receiving data from the AR mobile devices indicating the current state and/or environment of the AR device and/or user, and by providing data to the AR mobile devices as needed.

The network 16 includes one or more wireless networks, and possibly also one or more wired networks. In the example embodiment of FIG. 1, the AR platform of the AR system 10 utilizes a cloud-based architecture, and the network 16 includes the Internet. If the AR system 10 is utilized indoors, the network 16 may also include wireless networks that do not require any direct communication with a remote tower or base station, such as an IEEE 802.11 or "WiFi" network. In other embodiments, however, the network 16 includes a cellular network (e.g., LTE, GSM, etc.). As discussed further below, the AR system 10 may also include one or more other servers 18 that are communicatively coupled to the back-end server 14 and/or the AR mobile device 12, and collectively store and execute one or more applications 19.

As seen in the example embodiment of FIG. 1, the AR mobile device 12 may include a network interface 20, a display 22, a camera 24, an inertial measurement unit (IMU) 26, and a memory 30 storing an AR application 32. The network interface 20 is configured to enable communications with remote computing devices and systems, including the back-end server 14, using a wireless communication protocol of at least a portion of the network 16 (e.g., a WiFi or cellular network).

The display 22 may include hardware and associated firmware and/or software configured according to any suitable type of digital display technology. For example, the display 22 may use liquid crystal display (LCD) technology, light-emitting diode (LED) technology, organic light-emitting diode (OLED) technology, and so on. The display 22 may be generally transparent or translucent, or may be opaque. The structure or form factor of the display 22, and whether the display is transparent/translucent or opaque, generally depends on the type of the AR mobile device 12. If the AR mobile device 12 is a helmet, for example, the display 22 may have the form of a visor, and may be translucent such that any information displayed by the display 22 is superimposed on the direct, real-world view of the user (i.e., a "heads up display" or "HUD"). Conversely, if the AR mobile device 12 is a tablet or smartphone, the display 22 may have a conventional, rectangular form factor, and may only allow indirect views of the real-world (e.g., as captured by the camera 24).

The camera 24 may be any suitable type of optical sensor, such as a charge-coupled device (CCD) image sensor, for example. In alternative embodiments, the camera 24 is instead, or also includes, a different type of imaging device, such as a light detection and ranging (lidar) sensor or radar sensor, for example. The IMU 26 may include one or more sensors (e.g., accelerometers and/or gyroscopes) that generate data indicative of movement of the AR mobile device 12 in three dimensions. While not shown in FIG. 1, the AR mobile device may also have other components, such as microphone and/or speaker.

The memory 30 storing the AR application 32 may be any suitable type of persistent memory, such as a read-only memory (ROM) in solid state or hard drive form, for example. The AR application 32 generally coordinates the AR experience for the user of the AR mobile device 12, e.g., by generating the appropriate augmented information on the display 22 and communicating with the back-end server 14 as needed. FIG. 1 depicts a set of modules corresponding to example functions or features that may be performed or provided by the AR application 32, including a role identification module 40, a registration module 42, a positioning and orientation module 44, a node experience module 46, a node creation module 48, a vision enhancement module 50, and a position-based alert module 52. Each of the modules 40-52 will be discussed further below in connection with the operation of the AR system 10. In some embodiments, the AR application 32 includes fewer, more, and/or different modules than those shown in FIG. 1. For example, the AR application 32 may include a voice recognition module for recognizing user voice commands.

Also in the example embodiment of FIG. 1, the back-end server 14 includes a web services interface 60, an experience provisioning unit 62, a 3D model generation unit 64, a machine learning (ML) model 65, a vision enhancement unit 66, an alert generation unit 68, and a user monitoring unit 70. Generally, the web services interface 60 may provide an object-oriented web-based interface to an AR database 72 that is coupled to (or included within) the back-end server 14. Training data 74 may also be stored in a database coupled to (or included within) the back-end server 14. In some embodiments, the web services interface 60 provides an application programming interface (API) to remote devices, such as the AR mobile device 12.

The AR database 72 generally stores information defining a 3D map of a particular environment (e.g., by storing node identifiers, locations of the nodes within the 3D map relative to the landmark, and possibly other information associated with the nodes), and is discussed in further detail below (according to one particular embodiment) in connection with FIGS. 5A and 5B. The AR database 72 may be a single database or a collection of databases, and may be stored in a single physical memory, or distributed across multiple memories at one or more geographic locations. Similarly, the training data 74 may be stored in a single database or a collection of databases, and may be stored in a single physical memory, or distributed across multiple memories at one or more geographic locations. One, some or all of the elements/units 60 through 70 may be implemented as software instructions stored on persistent memory (e.g., ROM).

In other embodiments, the back-end server 14 includes fewer, more, and/or different elements/units than those shown in FIG. 1.

In operation, a user who is wearing or otherwise carrying the AR mobile device 12 may cause the AR mobile device 12 to launch the AR application 32. The AR application 32 may be launched by manually selecting an icon on the display 22, issuing a voice command, or simply powering up the AR mobile device 12, for example.

In some embodiments, the role identification module 40 of the AR application 32 initially (e.g., upon launch) prompts the user to indicate a particular "role," which may correspond to the user's job position, and/or may correspond to the particular task or tasks that the user is trying to accomplish by using the AR system 10, for example. In other embodiments, the user is first prompted to indicate his or her role at a later time (e.g., after registering at a landmark, as discussed below). One example user interface that the role identification module 40 may superimpose over a real-world view seen on or through the display 22 (e.g., over image frames captured by the camera 24, or the over the user's direct real-world view) is discussed below in connection with FIG. 4A. In an alternative embodiment, the role identification module 40 does not prompt the user to select a role, and instead determines a pre-assigned role of the user based on an identifier of the AR mobile device 12 and/or identification (e.g., name, employee number, etc.) entered or spoken by the user.

The selected or assigned user role may condition various aspects of the AR experience provided to the user, as discussed further below. Depending on the embodiment, the user role may be fixed once selected or assigned, or may be changed on the fly by a user as he or she moves through the environment. In some embodiments, the role identification module 40 is not included in the AR application 32, and no user roles are selected or assigned within the AR system 10.

Prior to mapping an environment, or prior to updating or exploring a previously mapped environment, the user may, in some embodiments, need to register the AR mobile device 12 at a "landmark," the location of which is then used as a reference point for future movement of the AR mobile device 12 (and equivalently, the user). The same landmark location is also used as a reference point for the locations of any objects in the environment that have already been established (or will be established) as nodes of the 3D map, thereby enabling a determination of the position of the AR mobile device 12 relative to any mapped objects. The landmark location may represent {0,0,0} in an {x,y,z} coordinate system, for example, or other coordinate systems (e.g., polar coordinates) may be used. In some embodiments, registration at a landmark is required in order to gain physical access to the environment. For example, a locked door or gate to a process control environment may be automatically unlocked in response to a user registering the AR mobile device 12 at the landmark. The AR mobile device 12 may utilize near-field communications (e.g., Bluetooth) or other suitable technology to send a message to a fixed-location (e.g., wall-mounted) unit having a transceiver, for example, after which the fixed-location unit may generate a command that causes an actuator to unlock (and/or open) the door or gate.

To register the AR mobile device 12, the registration module 42 may process one or more images/frames captured by the camera 24. The landmark may be a QR code, or any other suitable type of image or text that is physically printed at the landmark location (e.g., on a wall or door near an entrance to an area within a process control plant), for example. In some embodiments, the registration module 42 or another portion of the AR application 32 may superimpose a reticle within the real-world view provided to the user (e.g., as discussed below in connection with FIG. 4E), to help the user focus on the QR code, image, etc. In some embodiments, a different technology is used to recognize the landmark, such as complementary Bluetooth or NFC communication units of the AR mobile device 12 and another device fixed at the landmark location.

In some embodiments, when the user registers the AR mobile device 24 at a particular landmark, the registration module 42 forwards data indicative of an identifier of the landmark (e.g., by transmitting a binary representation of the QR code, or transmitting the image of the QR code prior to decoding the image) to the back-end server 14 via the network 16 and web services interface 60. The back-end server 14 may then compare the landmark identifier to landmark identifiers (if any) stored in the AR database 72. If the identifier is not already stored, the back-end server 14 may return a failure message to the registration module via the web services interface 60 and the network 16 or, in some embodiments, may cause the AR database to create a new landmark identifier entry associated with a new 3D map. Conversely, if the landmark identifier already exists in the AR database 72, the back-end server 14 may make some or all of the corresponding 3D map (and associated data) available to the AR mobile device 12, and return a message indicating successful registration to the registration module 42 via the web services interface 60 and the network 16.

The AR database 72 may store a number of different landmark identifiers each associated with a different 3D map, with each map being associated with a different library of nodes. Multiple maps may be associated with a same environment (e.g., by adding different objects within the single environment as nodes of the different maps), and/or different maps may be associated with different environments (e.g., one map for a first area of a process control plant, another map for a second area of the plant, etc.).

In some embodiments, successful registration of the AR mobile device 12 at the landmark causes the positioning and orientation module 44 to set the location of the AR mobile device 12 equal to the landmark location (e.g., {0,0,0}). For greater precision, however, the registration module 42 may process the image of the landmark captured by the camera 24, using a depth sensing technique, to determine the distance between the AR mobile device 12 and the landmark. The positioning and orientation module 44 may then offset the starting position of the AR mobile device 12 from the known/reference position of the landmark based on both the determined distance from the landmark and the orientation of the AR mobile device 12 relative to the landmark. If the landmark is a QR code or other visual identifier, the relative orientation of the AR mobile device 12 may be assumed based on the direction the landmark is facing. Alternatively, the relative orientation may be determined from the captured image (e.g., by determining an angle of incidence of the camera view relative to the landmark, etc.).

Once registered, the user of the AR mobile device 12 may begin to move through the environment, with a real-world view (provided via the display 22) that is generally augmented by digital text, tables, graphics, animations, and/or other types of information associated with the 3D map corresponding to the landmark. To track the position and orientation of the user (i.e., of the AR mobile device 12), the positioning and orientation module 44 may access the IMU 26, the camera 24, and/or one or more other sensors of the AR mobile device 12 not shown in FIG. 1. In some embodiments, the positioning and orientation module 44 uses the collected sensor data to determine positions and orientations without relying on GPS, GNSS, WiFi positioning (e.g., trilateration), or any other positioning technologies that require a communication link between the AR mobile device 12 and other devices or systems. "Position" or "location" may refer to a particular set of coordinates in a 3D coordinate system (e.g., Cartesian or polar), and "orientation" may refer to a particular direction (e.g., in a 360 degree horizontal/azimuthal range, plus elevation or altitude). In some embodiments, "orientation" may further refer to the tilt of the AR mobile device 12, independent of the direction the device 12 is facing. Because only relative positions are tracked (e.g., in a "dead reckoning" sense), the positioning and orientation module 44 determines AR mobile device/user positions relative to the location of the landmark where registration occurred.

In some embodiments, the positioning and orientation module 44 processes a fusion of data from at least the camera 24 and IMU 26, to help overcome deficiencies associated with either type of sensor when used in isolation. For example, the positioning and orientation module 44 may utilize the Visual-Inertial Odometry (VIO) technology developed by Qualcomm® to track position and orientation of the AR mobile device 12. Such technology may help to improve accuracy, reduce "drift" in determined positions, and/or have other advantages.

Because the position and orientation of the camera 24 relative to the AR mobile device 12 itself is known, the AR application 32 can determine the field of view of the AR mobile device 12 (which may also, in some embodiments, correspond to the real-world view of the user) for any given position and orientation determined by the positioning and orientation module 44. Based on the determined position and orientation, and using the node locations stored in the AR database 72 for the 3D map, the AR application 32 may therefore determine which mapped objects are within the field of view at any given time. In some embodiments, an object may be considered to be "within the field of view" of a camera if the object is within the horizontal and vertical range/extent of the camera sensor (e.g., within certain azimuthal and vertical/altitude/elevation angles), regardless of the distance between the object and the AR mobile device capturing the images, and regardless of whether the object happens to be blocked by obstacles in the environment. For example, an object directly and immediately in front of the camera 24 may be considered "within the field of view" of the camera 24, even if the object is shielded by an enclosure, barrier, other object, etc. In other embodiments, an object is only considered to be "within the field of view" of the camera if the object is not obscured, i.e., while the camera is able to capture images of the object.

To determine the positions of mapped objects, the AR application 32 may periodically access node locations in the AR database via the network 16 and web services interface 60. For example, the AR application 32 may periodically request that the back-end server 14 provide location data for nodes within a threshold distance of the AR mobile device 12 (and/or within the field of view of the device 12, etc.), with the request indicating the current position (and/or orientation) of the AR mobile device 12. Alternatively, the AR application 32 may request that the back-end server 14 send all node locations (and possibly other information, such as node descriptions, etc.) for the 3D map that is associated with the landmark used for registration, e.g., at the time of registration. In still other embodiments, the back-end server 14 may automatically send all relevant node locations when the AR mobile device 12 successfully registers at the landmark.

The AR application 32 may determine that augmentation should be provided for one, more than one, or none of the mapped objects/nodes in the user's current field of view. To make this determination, the node experience module 46 may apply one or more criteria. In some embodiments, for example, the node experience module 46 may determine that augmentation is to be provided for all mapped objects in the user's current field of view, regardless of the distance between the object and the user and regardless of whether the object is blocked from the user's view by any obstacles. Alternatively, the node experience module 46 may determine that augmentation is not to be provided for mapped objects that are in the field of view but more than a threshold distance away from the user (e.g., as determined from the current user position determined by the positioning and orientation module 44, and from the corresponding node location stored in the AR database 72).

The node experience module 46 may also, or instead, determine that augmentation is not to be provided for mapped objects that are in the field of view of the AR mobile device 12 but blocked from sight. Whether mapped objects are obscured may be determined in different ways, depending on the embodiment. For example, a field in the AR database 72 may indicate whether a particular node corresponds to an object that would generally be obscured. For instance, for a component that is enclosed within a cabinet, the corresponding node have a field indicating the relationship between the component and the cabinet. In other embodiments, the AR application 32 and/or the back-end server 14 may perform a more complex analysis of node configurations, node types, and/or node sizes to determine whether, from the user's current perspective, a particular mapped object would likely be visible.

In some embodiments, to reduce the danger of sensory overload for the user, augmentation is not provided for certain types of mapped objects unless the user takes some specific action (beyond simply moving and/or re-orienting the AR mobile device 12). For example, the node experience module 46 may not provide augmentation for a large number of relatively small components within a cabinet, each corresponding to a different mapped object, unless the user selects an icon or other graphic representation of the cabinet, and/or selects an option to show cabinet contents, etc.

Further, in some embodiments, the node experience module 46 may determine whether augmentation is to be provided for a particular mapped object in the user's field of view based on the user's role, as determined by the role identification module 40. Thus, the node experience module 46 may query web services interface 60 specifically for nodes that are associated with both the landmark and the selected or assigned role. In a process control environment, for example, a power switch may be augmented for a user having a "maintainer" role, but not for a user having an "operator" role.

For objects that are to be augmented, the node experience module 46 may initially superimpose a node "marker," such as text (e.g., a device identifier, status and/or description) and/or an icon or other graphic, etc., on an area of the display 22 that appears to the user as if it were located at (or near) the coordinates of the object in the user's real-world view. The marker may appear to be connected to the mapped object in the real-world view by a line rendered on the display 22, for example. In other embodiments, the marker is a circle or other shape rendered over the object, a rectangular outline roughly enclosing the object, or some other type of indicator.

If the user selects a particular node (e.g., by focusing a virtual reticle on the node marker, or by issuing a voice command, etc.), the node experience module 46 may make one or more "node experiences" available to the user. A "node experience"—in contrast to the more general "AR experience" of a properly equipped user moving through a mapped environment—refers to a particular type or types of user interaction with the object/node. The node experience module 46 may provide the user with the option of selecting specific node experiences by superimposing a menu or other interactive display on the real-world view, for example, and/or by being configured to recognize voice commands from the user. A user may select menu options in a manner similar to selecting node markers (e.g., focusing a virtual reticle on the option, voice command, etc.), or in another suitable manner.

When a specific node experience is selected, the node experience module 46 may forward the selection to the web services interface 60 via the network 16. In response, the experience provisioning unit 62 may retrieve data (e.g., text, graphics, etc.) associated with the selected node and the selected experience from the AR database 72 (and/or other locations, such as server(s) 18), and send the retrieved data back to the AR mobile device 12 via the web services interface 60 to enable the node experience module 46 to augment the user's real-world view accordingly.

A node experience may be relatively simple, or complex. The node marker itself may be considered a default "node experience," for example. As other examples, the node experience module 46 may superimpose other text and/or tables (i.e., information associated with the corresponding object) on the user's real world view (via display 22), a simple graphic or icon of the object, a hyper-realistic or pseudo-realistic 3D model of the object, an image of the object, an animation including the object (e.g., a rotating 3D model of the object), and so on.

Node experiences may also, or instead, include other types of interactivity. For example, the node experience module 46 may superimpose a link (e.g., a URL) to a video that provides a tutorial on the object and/or its operation within the environment (e.g., within a particular process control routine), to a work order that involves the object, or to a remote expert. Alternatively, or in addition, the user may issue voice commands for some or all of these node experiences. In an embodiment where content such as a video or work order is selected or called, the node experience module 46 may superimpose the content on the user's real-world view. If a remote expert or other person is selected or called, the node experience module 46 may cause the network interface 20, or another suitable network interface, to establish a communication link with the person (e.g., via the network 16), and in some embodiments may superimpose a still image or video of the person until the communication ends.

Other node experiences may list and/or graphically depict particular types of relationships between the selected object/node and other objects/nodes. For one node experience, for example, the node experience module 46 may superimpose a list of objects/nodes related to the selected object/node (e.g., parent and/or child objects/nodes) over the user's real-world view. A "relationship" may be defined in any way desired, and may be manually set by a user when adding a new node, or set in another suitable manner. For example, some relationships may refer to whether an object is a component of another object, and/or itself includes a number of components. A valve may correspond to a node that is a parent to a group of nodes each corresponding to components of the valve, for instance.

The node experience module 46 may determine relationships by querying the experience provisioning unit 62 via web services interface 60, with the experience provisioning unit 62 retrieving identifiers of the related nodes from the AR database 72 and providing an indication of those nodes to the node experience module 46. By not showing, by default, node markers and/or node experiences for all of the individual valve components (e.g., unless a node or a particular option is specifically selected by the user), the user may be spared from receiving an overwhelming amount of visual information all at once.

Some kinds of relationships may be graphically depicted to the user. For example, the node experience module 46 may provide a graphical depiction of a physical or logical connection between the object corresponding to the selected node and one or more other objects corresponding to other nodes. The node experience module 46 may determine connections by querying the experience provisioning unit 62 via web services interface 60, with the experience provisioning unit 62 retrieving identifiers of the connected nodes from the AR database 72 and providing an indication of those nodes to the node experience module 46. The node experience module 46 may then generate a display depicting lines connected the appropriate objects, and superimpose the lines on the user's real-world view. One example of such a node experience is provided in FIG. 4H, discussed below.

The connections and/or other relationships shown may also vary based on the user's selected or assigned role. In a process control environment, for example, an "operator" may be shown a line from a sensor/transmitter device to a tank, with the line indicating that the sensor/transmitter measures the pressure in the tank. Conversely, an "engineer" may instead (or additionally) be shown a line from the sensor/transmitter to another device that receives the sensor transmissions, and a "maintainer" may instead (or additionally) be shown a line from the sensor/transmitter to a power source for the device (e.g., so the maintainer can easily find where to shut down power before maintaining, repairing or replacing the device).

In some embodiments, the experience provisioning unit 62 utilizes data and/or functionality from other server(s) 18 and/or application(s) 19 in order to provide one or more node experiences, and/or one or more of the application(s) 19 may be launched in response to data sent from the experience provisioning unit 62. Some examples of such embodiments, in a process control environment, are discussed below in connection with FIG. 2.

As noted above, the node experience module 46 may determine whether to augment the user's real-world view of a particular mapped object based on the user's selected or assigned role (e.g., operator, maintainer, etc.). In addition, or alternatively, the types of node experiences, and/or the content or interactivity provided by a particular experience, may vary based on the user role. For example, a user having a role of "maintainer," and having a pump in his or her real-world view, may be presented with a node experience showing a scheduled maintenance reminder for the pump, while a user having a role of "operator" or "engineer" may instead be presented with information relating to logical connections of the pump within a process control routine. The maintainer may be shown an alert if the scheduled maintenance is overdue, while the operator or engineer may only be shown an alert in other scenarios (e.g., if the pump fails).

The node creation module 48 supports the addition of new nodes within the 3D map corresponding to the landmark used to register the AR mobile device 12. In some embodiments, any user can add new nodes to a 3D map. In other embodiments, only certain user roles, and/or only certain AR devices, can be used to add new nodes. To add a new node, a user may direct the field of view of the AR mobile device 12 (e.g., a reticle centered within the field of view) to a real-world object that is to be mapped, and select an option to add the object as a new node.

This may be accomplished in different ways, depending on the embodiment. For example, the user may select a superimposed menu item (e.g., a virtual "Add Node" button), or issue a voice command, and the node creation module 48 may superimpose a reticle on the user's real-world view in response. While aiming the reticle at the object, the user may activate another control (e.g., a virtual "Confirm" button) or issue a second voice command. In response, the node creation module 48 may determine a position of the object, and prompt the user to enter a node name and/or description. The node creation module 48 may then send the position, the entered or spoken name, etc., to the web services interface 60 via the network 16, and the 3D model generation unit 64 may add at least the position and a node identifier (e.g., the node name entered or spoken by the user) to the AR database 72.

To determine the position of the object being mapped, the node creation module 48 may utilize the current position of the AR mobile device 12 (as determined by the position and orientation module 44), and offset that position based on both the distance between the AR mobile device 12 and the object, and the orientation of the AR mobile device 12. This may be accomplished in a manner similar to determining the initial 3D position of the AR mobile device 12 when registering at the landmark, as described above. For example, the node creation module 48 may process the image of the object captured by the camera 24, using a depth sensing technique, to determine the distance between the AR mobile device 12 and the object. The positioning and orientation module 44 may then offset the object position from the position of the AR mobile device 12 based on both the determined distance and the orientation of the AR mobile device 12 (e.g., based on the distance and the direction that the field of view of the AR mobile device 12 was facing when the image of the object was captured).

In some embodiments, the node creation module 48 may also be used to update/modify existing nodes. For example, a menu that is provided by the node experience module 46 may include an option for updating node information. If selected, the node creation module 48 may superimpose one or more menus or other user interfaces on the user's real-world view, to enable the user to change information pertaining to the node (e.g., node name, node description, etc.). Any changes may be sent to web services interface 60 via the network 16, and the 3D model generation unit 64 may update the AR database 72 accordingly.

In some embodiments, the AR application 32 configures the AR mobile device 12 to enhance the virtual vision of the user, beyond the augmentation features described above. For example, for certain types of nodes, the vision enhancement module 50 may determine when a mapped object is within an area captured by the user's current field of view (e.g., as discussed above for the node experience module 46), but obscured by one or more other objects, and provide virtual "x-ray vision" to the user. The virtual x-ray vision may only be provided if one or more other criteria is/are established (e.g., if the vision enhancement module 50 determines that the hidden object(s) is/are within a threshold distance of the AR mobile device 12), or may be provided regardless of any other criteria.

In one such embodiment, the AR database 72 includes, for each of at least some of the node entries, a flag or other visibility indicator indicating that the node is likely hidden from any user's view. This visibility indicator may have been generated automatically based on a known relation of objects (e.g., if the 3D model generation unit 64 accesses a control system to learn that the object corresponding to the node is positioned within a cabinet), or may have been manually set by a user (e.g., when adding the node, via a user interface that the node creation module 48 superimposes on the real-world view of the user). When a particular mapped object is within the user's field of view, the vision enhancement module 50 may query the vision enhancement unit 66 of the back-end server 14, via the network 16 and web services interface 60, and the vision enhancement unit 66 may in turn access the AR database 72 to retrieve the relevant visibility indicator. The vision enhancement unit 66 may then use web services interface 60 to send the visibility indicator, or other data indicating whether the object is obscured, to the vision enhancement module 50.

Alternatively, the vision enhancement module 50 and/or vision enhancement unit 66 may make the visibility determination in other ways. For example, a particular mapped object or set of objects may be inside a cabinet that is marked with a model number, QR code, or other visual indicator. The vision enhancement module 50 may process an image of the visual indicator that is captured by the camera 24 to determine an identifier (e.g., node identifier) of the cabinet, and send the identifier to the vision enhancement unit 66 via web services interface 60. The vision enhancement unit 66 may then use the identifier to determine which mapped objects (e.g., field devices, I/O cards, etc.) are within the cabinet, and send back data indicating that the objects that are within the cabinet are obscured.

To provide the effect of virtual x-ray vision for a given object, the vision enhancement module 50 may retrieve a hyper-realistic or pseudo-realistic 2D or 3D model of the object, or a digital image or video of the object, and superimpose that model, image, or video over the object (or near the object) in the user's field of view. Either by default, or in response to a user selection of the 2D or 3D model, or voice command, etc., the node experience module 46 may also provide visual menu options or voice command recognition to enable the user to select various experiences for the node, as described above. Thus, the user may interact with the hidden object in a manner that appears and "feels" very similar to interacting with the real-world object while it is directly in his or her field of view.

The vision enhancement module 50 may also, or instead, enhance a user's virtual vision in other ways. If an object is in a limited-access and/or dangerous area (e.g., in a very high location, a barricaded location, a high-voltage or toxic area, etc.), and/or far away from the user, for example, the vision enhancement module 50 may enable the user to retrieve an "avatar" that represents the object into his or her field of view. The avatar may be the same as the 2D or 3D model, image, video, etc., described above for the x-ray vision example, or may differ in some respects. Indeed, in some embodiments, virtual x-ray vision is simply one of multiple use cases for summoning an avatar of a real-world object.

An avatar may be summoned in different ways, depending on the embodiment and/or the scenario. In some embodiments, the vision enhancement module 50 first superimposes a visual indicator on the user's real-world view, if certain criteria are satisfied, with the visual indicator giving some indication of the corresponding object's location relative to the user's real-world view. For example, the visual indicator may be presented if both (1) the AR mobile device 12 is within some threshold distance of the object, and (2) the node is flagged as a limited-access object. The AR database 72 may store data indicating such a status, for example (e.g., based on a manual user input when the node was added by a user), or the status may be inferred (e.g., if the vision enhancement unit 66 determines the object is in a region that the back-end server 14 has flagged as a "danger" region, or if the vision enhancement module 50 or vision enhancement unit 66 determines the position of the object is at least a threshold distance from the AR mobile device 12 in the z-direction and thus at a very different elevation, etc.). The visual indicator may include an arrow pointing in the direction of the object, a line leading to the object, or some other indication of location. One example of a visual indicator is discussed below in connection with FIG. 7A. If the user selects the indicator or takes another suitable action (e.g., in some embodiments, if the user changes his or her field of view to include the object), the vision enhancement module 50 may superimpose the avatar on the user's real-world view.

In other embodiments, the indicator of the object's location includes the avatar itself (e.g., with an arrow/pointer to the object location overlying or near the avatar). In still other embodiments and/or scenarios, the vision enhancement module 50 superimposes the avatar on the user's field of view without presenting any visual indicator of the object's location. For example, the vision enhancement module 50 may present the avatar to the user in response to the user requesting or searching for the corresponding object (e.g., by issuing a voice command or manually entering data), or in response to the user selecting a node marker for a relatively distant object (e.g., more than some threshold distance away), etc. In one such embodiment, the avatar does not instantly appear at full size. For instance, the vision enhancement module 50 may create a visual effect in which the avatar appears to the user as if it moves from the object location (e.g., far ahead of the user) to a position just in front of the user. The avatar may expand in size to simulate the effect of drawing nearer to the user, for example.

The node experience module 46 may automatically provide a particular node experience for the object to the user (in addition to showing the object's avatar), and/or may enable the user to select one or more node experiences after the avatar is first presented (e.g., by issuing a voice command or selecting menu options). For example, any one or more of the node experiences discussed above may be provided. One example of an experience that may be associated with an avatar is discussed below in connection with FIG. 7B.

In some embodiments, the AR application 32 configures the AR mobile device 12 to generate alerts based on the user's current position and/or based on current circumstances in particular areas (e.g., certain regions of a process plant being associated with a warning). The alert generation unit 68 may periodically or continuously determine whether the current position of the AR mobile device 12 is in an area subject to an alert or warning, e.g., by comparing positions reported by the positioning and orientation module 44 (via web services interface 60) to the boundaries of one or more geo-fenced areas. If the user/device is in an area associated with an alert, the alert generation unit 68 may send an indicator of the alert to the position-based alert module 52 via web services interface 60, and the position-based alert module 52 may superimpose an indication of the alert (e.g., text and/or a graphic) on the user's real-world view, cause some other visual effect (e.g., a flashing red light or tint encompassing the entire real-world view), and/or provide an audio alert to the user (via a speaker of the AR mobile device 12, not shown in FIG. 1). Alternatively, or additionally, the alert generation unit 68 may send an alert indicator based on the proximity of the AR mobile device 12 to a particular mapped object (e.g., if the object is malfunctioning and needs maintenance, or should be avoided, etc.). The alert generation unit 68 may also condition the delivery of alerts on the user's selected or assigned role.

In some embodiments, the back-end server 14 may monitor the 3D locations of AR mobile devices (and thus, users) in the mapped environment. To this end, the user monitoring unit 70 may record current and/or historical positions of users who have registered their AR mobile devices at a landmark, based on data received from the positioning and orientation module 44 via web services interface 60.

User location monitoring may be used for various purposes, depending on the embodiment and/or the need. For example, the user monitoring unit 70 may depict user locations on a display or terminal coupled to the back-end server 14 (and not shown in FIG. 1), and an operator of the display or terminal may account for employee locations in the event of an emergency, or simply monitor users in more typical conditions to determine whether any employees are in need of medical aid. Employee health may also be monitored using other data, such as biometric data collected by one or more sensors of the AR mobile device 12 (e.g., to detect pulse, blood pressure, temperature, etc.). As further examples, employee/user locations may be added to employee training logs, used by managers or human resources personnel to monitor compliance with protocols, used by the back-end server 14 to provide location-specific "help" information to the user, and so on. In still other embodiments and/or scenarios, 3D locations of certain non-human mobile assets may be tracked within the mapped environment. For example, a unit of the back-end server 14 may monitor 3D locations of mobile reactors, carts, field service trucks, and/or other objects for various purposes.

In various embodiments, the ML model 65 is used to enhance the AR platform. The ML model 65 is trained, using training data 74, to recognize objects of a sort that may be expected within the process control (or other) environment. The ML model 65 may be any suitable type of artificial neural network, such as a recurrent neural network, for example. In some embodiments, the ML model 65 is, or incorporates, the Core ML® model from Apple®. In one alternative embodiment, the ML model 65 is included in a different computing system, and the back-end server 14 remotely accesses the ML model 65 as needed. In still another embodiment, the ML model 65 is stored in the memory 30 of the AR mobile device 12 (e.g., after being downloaded from the back-end server 14 via the web services interface 60), in which case use of the ML model 65 by the AR application 32 may not require communication between the AR mobile device 12 and the back-end server 14.

The training data 74 may include images of various different objects that might typically be encountered within the environment (e.g., process control equipment, field devices, and/or other assets), with each image or subset of images being labeled with a descriptor of the object type for the pictured image(s). For example, human reviewers may have manually labeled images for a collection of different object types. Depending on the embodiment and/or the pictured object, there may be only one label per image/object, or multiple labels per image/object. Any suitable supervised learning technique may be used to train the ML model 65 using the training data 74. While FIG. 1 shows the training data 74 as being included in the AR system 10, it is understood that, in some embodiments, the ML model 65 is a copy of a model that was trained using a computing system entirely separate and remote from the AR system 10.

In one embodiment, the AR platform uses the trained ML model 65 to allow mapping users to more easily classify or categorize an object that is being added to the 3D map, which may facilitate map creation and/or map updates. When the user of the AR mobile device 12 aims a reticle on the display 22 at a particular object, for instance, and activates a control (e.g., a virtual "Confirm" button or a voice command), the node creation module 48 may, in addition to its functionality described above, locally or remotely access the ML model 65 to obtain a classification of the object that is currently aligned with the reticle. For example, the node creation module 48 may send a captured image or images to the web services interface 60 via the network 16, and the 3D model generation unit 64 may use the ML model 65 to process the image(s) (i.e., use the image(s) as input(s)/feature(s)) and output a predicted classification for the object. The camera 24 may capture the image(s) in response to the user activation of the control, or may simply capture the image(s) in the course of its normal operation (e.g., if the camera 24 continually captures a number of frames per second).

If the ML model 65 resides at the back-end server 14, the back-end server 14 may then return the predicted classification to the AR mobile device 12 (e.g., via the web services interface 60 and the network 16). Once the AR application 32 obtains the predicted classification (whether from the back-end server 14 or from a local source), the node creation module 48 may cause the classification to be presented to the user in some way. For example, the node creation module 48 may cause the display 22 to superimpose, over the user's real-world view, a text representation of the predicted classification (e.g., a general object type, or a specific model number, etc.), and the user may have the option of applying the classification as a descriptor for the new node representing the object (e.g., by saying "confirm," or by entering the classification in a descriptor field, etc.). The node creation module 48 may then cause the 3D model generation unit 64 to add the new node, with the name/descriptor that is selected (e.g., confirmed) by the user and with the corresponding location within the environment, in the manner described above.

In some embodiments and/or scenarios, the ML model 65 outputs two or more candidate types/classifications for the pictured object, and the user is presented with two or more respective options for populating/entering the object descriptor. For example, the options may be presented on the display 22 in a list that is superimposed on the user's real-world view. The ML model 65 may output a confidence level for each output classification, and the options may be ranked and ordered from highest to lowest confidence level when presented to the user, for example. A fixed or user-configurable threshold may also be used to set a minimum confidence level, with candidate object types having a confidence level lower than that threshold being omitted from the user display.

Alternatively, or in addition, the AR platform may use the trained ML model 65 to improve location/positioning accuracy for users navigating a previously mapped (or partially mapped) environment. As described above, the positioning and orientation module 44 may use the IMU 26, the camera 24, and/or one or more other sensors of the AR mobile device 12 (not shown in FIG. 1) to track the changing locations of the user/device 12 relative to a landmark at which the AR mobile device 12 was initially registered. However, even advanced "dead reckoning" technologies such as VIO will have some amount of drift over time as the user moves about, due to small errors introduced by the sensors and/or the processing of sensor data.

To correct for at least some of this drift, the positioning and orientation module 44 may cause images obtained by the camera 24 to be input to the ML model 65 (e.g., via the network 16 and the web services interface 60, if the ML model 65 resides in the back-end server 14) as the user moves about the environment. The images may be provided to the ML model 65 on a regular basis (e.g., every frame of camera data, with frames being recorded at some number of frames per second), in response to a trigger (e.g., user command), or on some other suitable basis. In this embodiment or aspect, the objects may not need to be lined up with a reticle of the AR mobile device 12 in order for the ML model 65 to recognize an object type; that is, it may be sufficient that the object is entirely within a given image, or even that a portion of the object is within a given image.

Thereafter, when the ML model 65 has output a predicted type for an object within an image, that object type may be used to determine which node corresponds to the pictured object. For example, a drift correction unit (not shown in FIG. 1) of the back-end server 14 or the AR mobile device 12 may receive the predicted object type (locally, or from the AR mobile device 12, etc.), and use both the current estimated location of the AR mobile device 12 (e.g., as generated by the positioning and orientation module 44) and the predicted object type to identify a node in the AR database 72 that corresponds to that location and object type. For example, the drift correction unit may determine that any node of the AR database 72 that (1) is associated with a stored location that is closest to, and/or lies within a threshold distance of, the current estimated position of the AR mobile device 12, and (2) is associated with a stored type/class that matches the predicted object type/class, corresponds to the pictured object.

In some embodiments, the current orientation of the AR mobile device 12, as determined by (or using data generated by) the positioning and orientation module 44, is also used to identify the node. For example, the drift correction unit may determine that any node of the AR database 72 that (1) is associated with a stored location that is closest to, and/or lies within a threshold distance of, the current estimated position of the AR mobile device 12, (2) is expected to be currently within the field of view of the camera 24, and (3) is associated with a stored type/class that matches the predicted object type/class, corresponds to the pictured object.

Once the corresponding node has been identified, the location of that node, as stored in the AR database 72, may be used to correct or update the location of the user/device 12. For example, the drift correction unit (if residing in the back-end server 14) may send the retrieved node location to the AR mobile device 12 via the web services interface 60 and the network 16, after which the positioning and orientation module 44 may use the node location to correct the user/device 12 location, and/or the back-end server 14 (e.g., the experience provisioning unit 62 and/or user monitoring unit 70) may use the node location to correct the user/device 12 location as stored at the back-end server 14.

In one embodiment, the user/device 12 location is simply reset to be the same as the node location. Such an approach, however, would not take into account the distance and direction between the user and the pictured object. Accordingly, in some embodiments, the positioning and orientation module 44 (or a unit of the back-end server 14) may also use additional information to correct the user/device 12 location. For example, the positioning and orientation module 44 (or a unit of the back-end server 14) may process one or more images from the camera 24 (e.g., the same image(s) used to predict the object class/type), in order to estimate a distance (or average distance, etc.) between the user/device 12 and the pictured object. Other suitable types of data may also, or instead, be used to determine the distance to the pictured object, such as data generated by a sonar, radar, lidar, or other depth-sensing device (not shown in FIG. 1) of the AR mobile device 12. Additionally, the orientation of the AR mobile device 12 may be used to determine the direction in which to offset the user/device 12 from the pictured object.

Once the location of the user/device 12 is corrected, and assuming that the node location stored in the AR database 72 is accurate, the user can be presented with an augmented experience that more accurately reflects his or her current, real-world position. That is, the experience provisioning unit 62 can begin to provide node experiences that are appropriate to the corrected, more accurate location of the user/device 12.

The ML model 65 may also, or instead, be used in still other ways within the AR platform. For example, the ML model 65 may be used to update locations of objects/nodes that have already been added (e.g., by the 3D model generation unit 64) to the map stored in the AR database 72. For example, after a node is identified for a pictured object (e.g., in the manner described above), the 3D model generation unit 64 may use the location of the user/device 12, as determined by the positioning and orientation module 44, to update the node location stored in the AR database 72. The distance and direction between the user/device 12 and the object (e.g., as determined using data from the camera 24, IMU 26, and/or one or more other sensors) may also be used to more precisely correct the node location.

In some embodiments, the 3D model generation unit 64 uses one or more rules to determine whether to update the node location. For instance, the 3D model generation unit 64 may only update the node location if it is known that the AR mobile device 12 uses a positioning technology that is superior to the positioning technology that was used by a device that initially mapped the object/node, or only if the AR mobile device 12 recently checked in at a landmark (e.g., within a threshold time and/or distance of the current time and/or location). In other embodiments, the 3D model generation unit 64 only updates a node location based on location data from multiple different AR mobile devices that have identified the pictured object. For instance, the 3D model generation unit 64 may update a node location based on the average location of the corresponding object, as estimated based on the location data, orientation data, and depth (e.g., camera) data from not only the AR mobile device 12, but also a number of other, similar devices.

In any of the implementations described above that utilize the ML model 65, the ML model 65 may, in certain embodiments, be further trained/refined after the (initially) trained ML model 65 is first put into operation. If the ML model 65 is used to facilitate creation of a new node, for example, the camera image(s) that were used to predict an object type, along with an object type that was predicted by the ML model 65 and confirmed or selected by the user (or, in some embodiments and scenarios, an object type that was indicated by the user but not predicted by the ML model 65), may be used to further train the ML model 65. That is, the additional camera images may be used as features, and the user-confirmed/selected/entered object types may be used as labels for the additional supervised learning.

As another example, if the ML model 65 is used to update or correct locations for navigating users, the camera image(s) that were used to predict an object type, along with an object type that was predicted by the ML model 65 and confirmed in some way (e.g., confirmed by successfully identifying a node that is near the user's location and corresponds to the predicted object type, or confirmed via a user input, etc.), may be used to further train the ML model 65. That is, the additional camera images may be used as features, and the confirmed object types may be used as labels for the additional supervised learning.

In some implementations, the images captured by the camera 24 (and/or the cameras of other AR mobile devices) may be collected over time to create an "AR cloud" of the environment, which may be used to train operators in a virtual reality setting, provide immersive experiences for remote support technicians, and so on. Moreover, in some implementations, the back-end server 14 may use the ML model 65 to automatically create new nodes for recognized objects, e.g., in the manner described above but without requiring any kind of user confirmation or other input/ commands. Thus, a 3D map could be created by simply walking and looking about the environment while holding or wearing the AR mobile device 12. Further, in some embodiments, the ML model 65 may be trained to recognize not only object types, but also types or classes that correspond to specific portions of objects, such as particular physical surfaces on an object, components of an object, states of an object (e.g., whether a physical switch is turned on or off, whether a conveyor belt is currently in operation, etc.), and so on.

It is understood that FIG. 1 and the above description represent only some potential embodiments, and that others are possible as well. For example, the AR platform may not use a cloud-based architecture or web-based services. As another example, the functionality of some or all of the units 62 through 68 of the back-end server 14, and/or the AR database 72 itself, may instead be partially or wholly incorporated into the AR mobile device 12. As yet another example, node markers and/or node experiences may be provided in a non-AR context, e.g., in a virtual reality (VR) context, or in connection with non-AR, non-VR graphical user interfaces (GUIs).

Moreover, the AR platform may provide still other features not discussed above. For example, users of AR mobile devices may add field notes (e.g., using voice commands) that are stored in association with various nodes/objects in the AR database 72, and/or may initiate new work orders associated with various nodes/objects, and so on.

Example Process Control Environment

Figure 2:
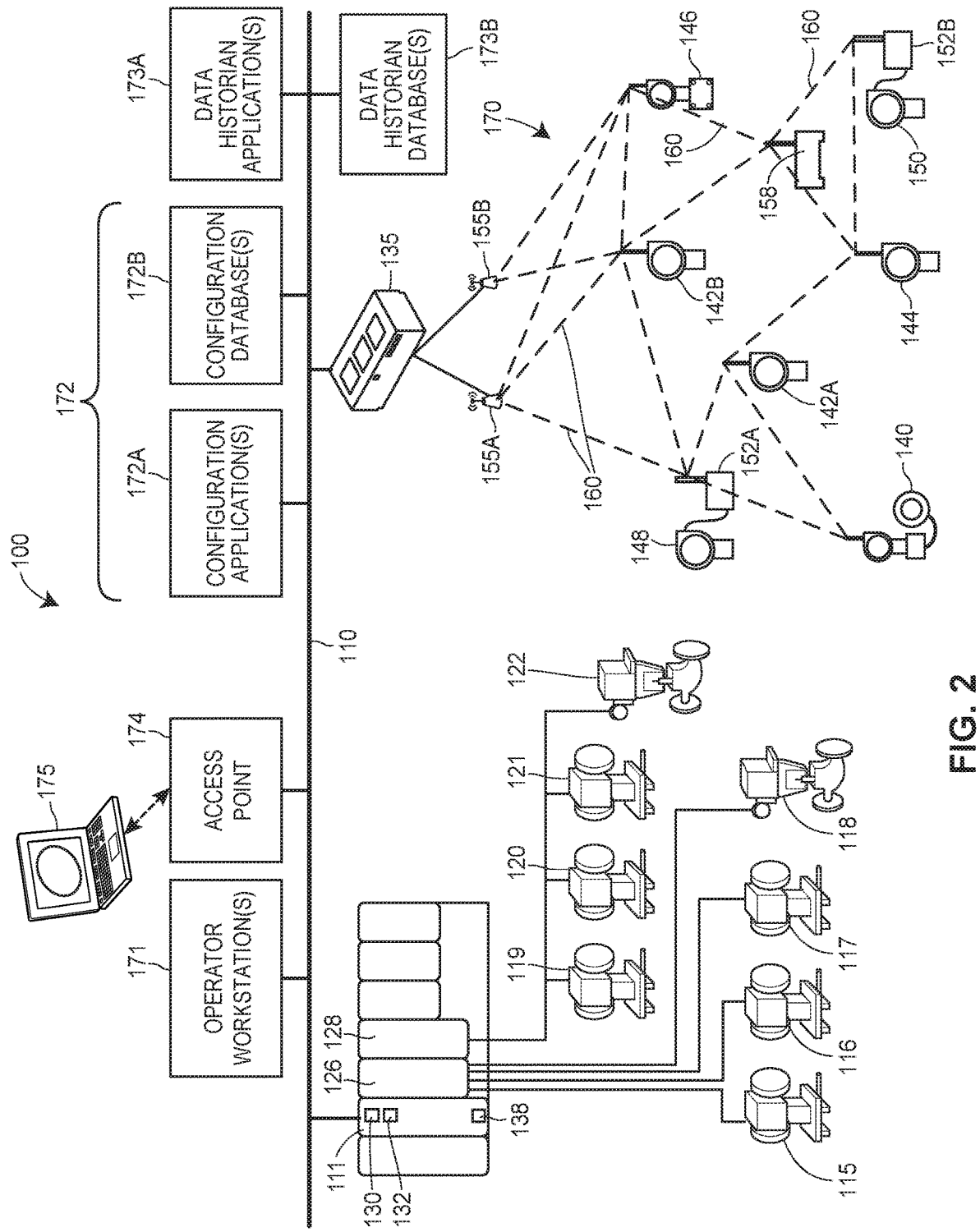
FIG. 2 is a block diagram depicting components of an example process control environment in which the AR system of FIG. 1 may be utilized.

FIG. 2 is a block diagram of an example process control environment 100 in which the AR system 10 of FIG. 1 may be utilized. The process control environment 100 (which is also interchangeably referred to herein as a process control system 100 or process plant 100) includes one or more process controllers that receive signals indicative of process measurements made by field devices, process this information to implement a control routine, and generate control signals that are sent over wired and/or wireless process control communication links or networks to other field devices to control the operation of a process in the plant 100. Typically, at least one field device performs a physical function (e.g., opening or closing a valve, causing a conveyor to move materials, increasing or decreasing a temperature, taking a measurement, sensing a condition, etc.) to control the operation of a process. Some types of field devices communicate with controllers by using I/O devices. Process controllers, field devices, and I/O devices may be wired or wireless, and any number and combination of wired and wireless process controllers, field devices, and I/O devices may be included in the process plant environment or system 100.

For example, FIG. 2 illustrates a process controller 111 that is communicatively connected to wired field devices 115-122 via input/output (I/O) cards 126 and 128. The process controller 111 includes a processor 130, a memory 132, and one or more process control routines 138 that are discussed in further detail below. The controller 111 is also communicatively connected to wireless field devices 140-146 via a process control communication network or backbone 110 and a wireless gateway 135. The backbone 110 may include one or more wired and/or wireless communication links, and may be implemented using any suitable communication protocol such as, for example, an Ethernet protocol. In some configurations (not shown in FIG. 2), the controller 111 may be communicatively connected to the wireless gateway 135 using one or more communications networks other than the backbone 110, such as by using any number of other wired or wireless communication links that support one or more communication protocols, e.g., an IEEE 802.11-compliant wireless local area network protocol, a mobile communication protocol (e.g., WiMAX, LTE, etc.), Bluetooth®, HART®, WirelessHART®, Profibus, FOUNDATION® Fieldbus, etc.

The controller 111 (which, by way of example, may be the DeltaV™ controller sold by Emerson Process Management) may operate to implement a batch process or a continuous process using at least some of the field devices 115-122 and 140-146. In an embodiment, in addition to being communicatively connected to the backbone 110, the controller 111 is also communicatively connected to at least some of the field devices 115-122 and 140-146 using any desired hardware and software associated with, for example, standard 4-20 mA devices, I/O cards 126, 128, and/or any suitable smart communication protocol such as the FOUNDATION® Fieldbus protocol, the HART® protocol, the WirelessHART® protocol, etc. In FIG. 2, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any suitable wired or wireless protocols, and including any suitable standards or protocols developed in the future.

The processor 130 of process controller 111 implements or oversees the one or more process control routines or modules 138, which may be stored in the memory 132. To this end, the processor 130 is configured to communicate with the field devices 115-122 and 140-146, and with other nodes that are communicatively connected to the controller 111. It should be noted that any control routines or modules described herein may have parts thereof implemented or executed by different controllers or other devices if so desired. Likewise, the control modules 138 to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The memory 132, on which some or all of the control modules 138 may be stored, may be any suitable type of memory or memories, such as random access memory (RAM) and/or read only memory (ROM). Moreover, the control modules 138 may be hard-coded into, for example, one or more EPROMs, EEPROMs, application specific integrated circuits (ASICs), or any other hardware or firmware elements. Thus, the controller 111 may be configured in any desired manner to implement a control strategy or control routine/module.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control-based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve or conveyor motor, to perform some physical function within the process control system 100. Of course, hybrid and other types of function blocks exist. Function blocks may be stored in and executed by the controller 111, which is typically the case when these function blocks are used for, or are associated with, standard 4-20 mA devices and certain types of smart field devices (e.g., HART® devices), or may be stored in and implemented by the field devices themselves, which can be the case with FOUNDATION® Fieldbus devices. The one or more control modules 138 in the controller 111 may implement one or more control loops which are performed by executing one or more of the function blocks.

The wired field devices 115-122 may be any type or types of devices, such as sensors, valves, conveyor motors, transmitters, positioners, etc., while the I/O cards 126 and 128 may be any types of I/O devices conforming to a suitable communication or controller protocol. For example, the field devices 115-118 may be standard 4-20 mA devices or HART® devices that communicate over analog lines (or combined analog and digital lines) to the I/O card 126, while the field devices 119-122 may be smart devices, such as FOUNDATION® Fieldbus field devices, that communicate over a digital bus to the I/O card 128 using a FOUNDATION® Fieldbus communications protocol. In some embodiments, though, at least some of the wired field devices 115-122, and/or at least one of the I/O cards 126, 128, additionally or alternatively communicate(s) with the controller 111 using the backbone 110 and a suitable control system protocol (e.g., Profibus, DeviceNet, Foundation Fieldbus, ControlNet, Modbus, HART, etc.).

In FIG. 2, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly. To communicate with other nodes that are not configured to communicate wirelessly, the wireless field devices 140-146 may utilize a wireless gateway 135 connected to the backbone 110 or another process control communications network. The wireless gateway 135 provides access, from the backbone 110, to various wireless devices 140-158 of the wireless communications network 170. In particular, the wireless gateway 135 provides communicative coupling between the wireless devices 140-158, the wired devices 115-122, and/or other nodes or devices of the process control plant 100.

Similar to the wired field devices 115-122, the wireless field devices 140-146 of the wireless network 170 perform physical control functions within the process plant 100, e.g., opening or closing valves, taking measurements of process parameters, etc. The wireless field devices 140-146, however, are configured to communicate using the wireless protocol of the network 170. As such, the wireless field devices 140-146, the wireless gateway 135, and other wireless nodes 152-158 of the wireless network 170 may be producers and consumers of wireless communication packets.

In some configurations of the process plant 100, the wireless network 170 includes non-wireless devices. For example, in FIG. 2, a field device 148 may be a legacy 4-20 mA device and a field device 150 may be a wired HART device. To communicate within the network 170, the field devices 148 and 150 are connected to the wireless communications network 170 via a respective one of wireless adaptors 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be integrated within the wireless gateway 135. The wireless network 170 may also include one or more routers 158 to forward packets from between wireless devices within the wireless communications network 170. The wireless devices 140-146 and 152-158 may communicate with each other, and with the wireless gateway 135, over wireless links 160 of the wireless communications network 170, and/or via the backbone 110.

In FIG. 2, the process control system 100 includes one or more operator workstations 171 that are communicatively connected to the backbone 110. Via the operator workstation(s) 171, human operators may monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located (but nonetheless in communicative connection with the plant 100). Operator workstation(s) 171 may be wired or wireless computing devices.

The example process control system 100 is further illustrated in FIG. 2 as including one or more configuration applications 172A and one or more configuration databases 172B, each of which is also communicatively connected to the backbone 110. Various instances of the configuration application(s) 172A may execute on one or more computing devices (not shown in FIG. 2) to enable users to create or change process control modules and download these modules via the backbone 110 to the process controller 111 and/or other process controllers, as well as enable users to create or change operator interfaces via which an operator is able to view data and change data settings within process control routines. The configuration database(s) 172B store(s) the configured modules and/or operator interfaces. Generally, the configuration application(s) 172A and configuration database(s) 172B may be centralized and have a unitary logical appearance to the process control system 100 (although multiple instances of a configuration application 172A may execute simultaneously within the process control system 100), and the configuration database(s) 172B may be stored in a single physical data storage device or across multiple data storage devices. The configuration application(s) 172A, the configuration database(s) 172B, and user interfaces thereto (not shown in FIG. 2) collectively form a configuration or development system 172 for creating/configuring control and/or display modules. Typically, but not necessarily, the user interfaces for the configuration system 172 are different than the operator workstations 171, with the user interfaces for the configuration system 172 instead being utilized by configuration and development engineers irrespective of whether the plant 100 is operating in real-time, and with the operator workstations 171 being utilized by operators during real-time (or "run-time") operations of the process plant 100.

The example process control system 100 also includes one or more data historian application(s) 173A and one or more data historian database(s) 173B, each of which is communicatively connected to the backbone 110. The data historian application(s) 173A operate(s) to collect some or all of the data provided across the backbone 110, and to store the data in the data historian database(s) 173B for long term storage. Similar to the configuration application(s) 172A and configuration database(s) 172B, the data historian application(s) 173A and data historian database(s) 173B may be centralized and have a unitary logical appearance to the process control system 100 (although multiple instances of a data historian application 173A may execute simultaneously within the process control system 100), and the data historian database(s) 173B may be stored in a single physical data storage device or across multiple data storage devices. The data historian application(s) 173A, the data historian database(s) 173B, and user interfaces thereto (not shown in FIG. 2) collectively form a data historian system 173.

In some configurations, the process control system 100 includes one or more other wireless access points 174 that communicate with other devices using other wireless protocols, such as IEEE 802.11-compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) or Bluetooth, and/or other wireless communication protocols. Typically, such wireless access point(s) 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, wireless devices 135, 140-158, etc.) also communicate using the wireless protocol supported by the wireless access point(s) 174.

It is noted that although FIG. 2 only illustrates a single process controller 111, and a particular number of field devices 115-122 and 140-146, wireless gateways 35, wireless adaptors 152, access points 155, routers 1158, and wireless process control communications networks 170 included in the example process plant 100, this is only an illustrative and non-limiting embodiment. For example, any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

Referring now back to FIG. 1, the objects mapped using AR mobile devices (e.g., AR mobile device 12), and/or the objects recognized using the ML model 65, may include some or all of the controller 111, the devices 115-122 and 140-158, the I/O cards 126, 128, the wireless gateway 135, and/or other devices and/or pieces of equipment in the plant 100, such that their 3D positions within the plant 100 (and possibly their relationships to each other, their avatars, etc.) are stored in the AR database 72. In some embodiments, the back-end server 14 may be communicatively coupled to the backbone 110, and the other server(s) 18 may include, or be coupled to, the operator workstation(s) 171, configuration system 172, data historian system 173, and/or other computing devices or systems of the process control environment 100.

The application(s) 19 run by the server(s) 18 may include one or more DeltaV™ applications, diagnostics and maintenance applications, and/or other applications or software-based systems. The application(s) 19 may thus support node experiences that display run-time status and/or measurement data of field devices, provide run-time controls for field devices, display diagnostics/maintenance information for machinery, and so on. As just one example, HART® and/or Fieldbus information associated with various devices may be presented to the user of the AR mobile device 12. The experience provisioning unit 62 may launch and/or interface with the appropriate application(s) 19 (e.g., via the backbone 110) to gather the required display data, which is then forwarded to the node experience module 46. The experience provisioning unit 62 may also, or instead, forward any user inputs that were received from the node experience module 46 to the controller 111 to cause the appropriate field devices to be controlled accordingly, etc.

Example 3D Map

Figure 3:
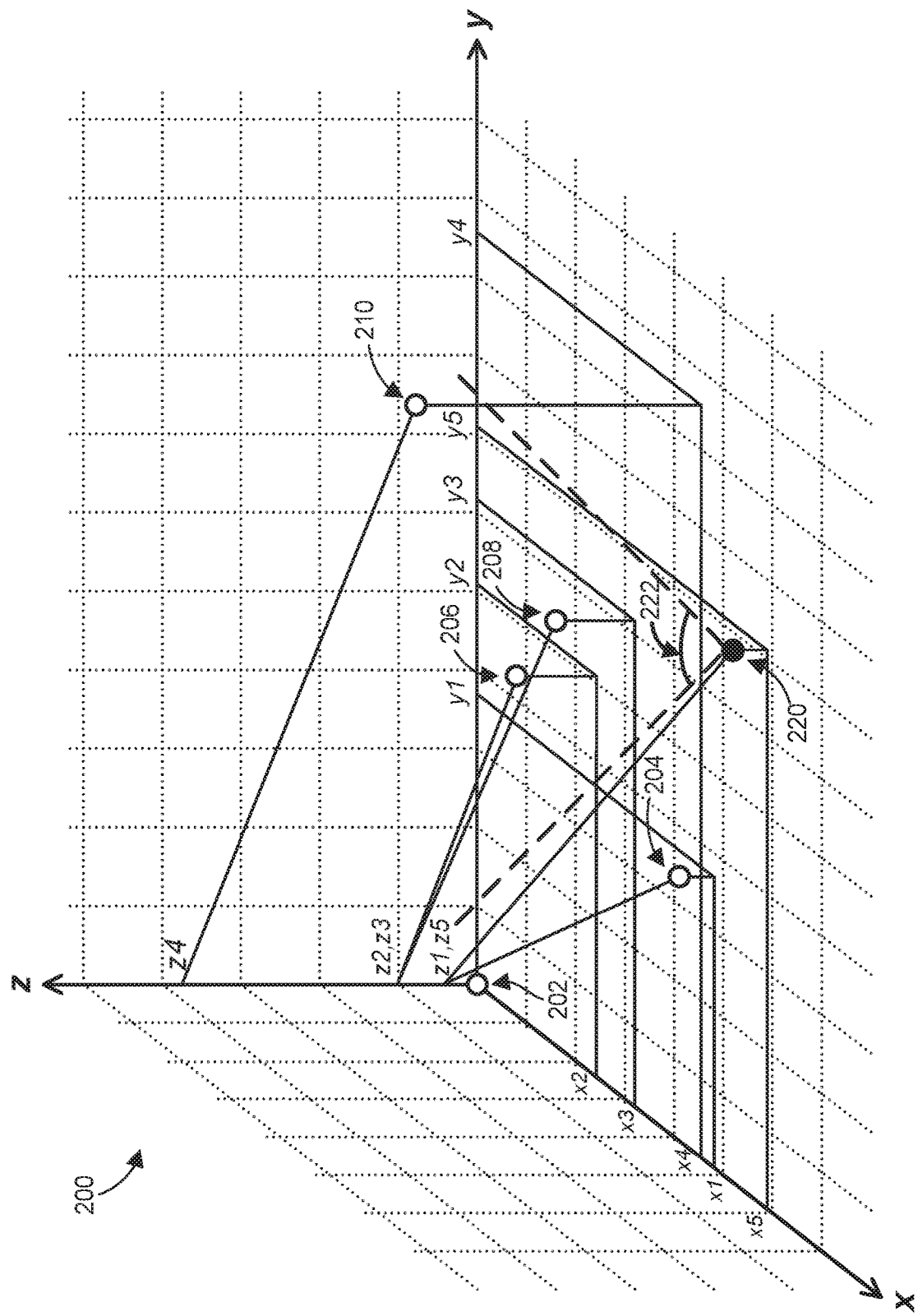
FIG. 3 depicts an example three-dimensional (3D) map of nodes in a process control environment.

It should be understood from the description of FIG. 1 above that the 3D "map" of the AR system 10 need not be a full model of the environment, and may include only 3D locations of nodes within that environment. A highly simplified example 3D map 200, containing only four objects/nodes, is shown in FIG. 3. In FIG. 3, the z axis corresponds to elevation (e.g., above ground level). As discussed above, a landmark location 202 may provide a reference point for all other locations (e.g., node and user/AR device locations) within the environment.

In the example map 200, a first location 204 of a first object/node is slightly above (elevation-wise) the landmark location 202 at the offset $\{x1,y1,z1\}$, second and third locations 206, 208 of second and third objects/nodes are a bit higher still at the offsets $\{x2,y2,z2\}$ and $\{x3,y3,z3\}$, respectively, and a third location 210 of a third object/node is higher still at the offset $\{x4,y4,z4\}$. Of course, in some scenarios, offsets in the x, y and/or z directions may be negative for certain objects/nodes.

Within the map 200, a location 220 at {x5,y5,z5} corresponds to a current location of an AR mobile device, such as the AR mobile device 12 of FIG. 1. FIG. 3 also depicts, in dashed lines, a field of view 222 of the AR mobile device, corresponding to a particular orientation of the device. The field of view 222 may be determined by the positioning and orientation module 44 of FIG. 1, for example, using sensor data from the IMU 26 (and possibly image data from the camera 26, e.g., with VIO technology) and a known azimuthal range/angle of the camera 26. While not illustrated in FIG. 3, the positioning and orientation module 44 may also know the extent of the field of view 222 in the z direction, e.g., such that the field of view 222 has a cone-like shape rather than assuming infinite coverage in the z-direction.

In this example scenario, the objects at locations 206 and 208 are within the device's/user's current field of view 222, while the objects at locations 204 and 210 are not. The experience provisioning unit 62 of FIG. 1 may make this determination, for example, based on the node positions (as stored in AR database 72), the location 220 and orientation of the AR mobile device (as determined by the positioning and orientation module 44 and forwarded via web services interface 60), and the known or estimated characteristics of the field of view for the camera 24. Based on the determination of which objects/nodes are within the field of view 222, the experience provisioning unit 62 may send data to the AR mobile device 12 indicating that a node marker (and/or a particular node experience) is to be presented only for the objects at locations 206 and 208. The node experience module 46 may process that data, and in response superimpose node markers and/or other information at or near points on the display 22 that correspond to the locations 206 and 208.

As another example, a module of the AR mobile device 12 or a unit of the back-end server 14 (neither shown in FIG. 1) may use the determined field of view 222, in conjunction with output of the ML model 65, to identify a node corresponding to an object recognized in one or more images from the camera 24. The node location, as stored in the AR database 72, may then be used to correct the location of the user/device 12, or vice versa, as described above.

Example AR User Interfaces

A set of example user interfaces that may be superimposed on an AR display (e.g., the display 22 of the AR mobile device 12 of FIG. 1) will now be described in connection with FIGS. 4A through 4H. For ease of explanation, reference will also be made to the AR system 10 of FIG. 1, although the user interfaces shown may instead be used in other systems. For user interfaces where user selections may be made, the selection may be made by the user looking directly at a specific menu option (e.g., if the user interfaces have a fixed position relative to the environment, rather than a fixed position relative to the center of the display 22). In other embodiments, the selection may be made by the user issuing an appropriate voice command, entering data on a keyboard or touch screen, or in another suitable manner.

Figure 4A:
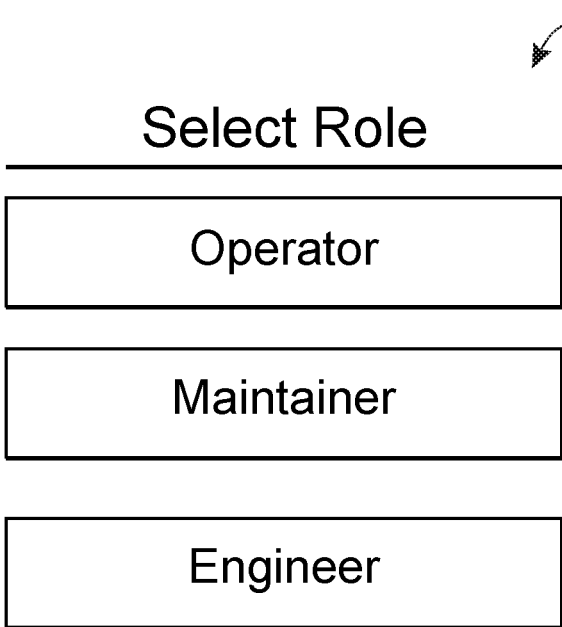

Referring first to FIG. 4A, a user interface 200 enables the user to select a particular "role," as discussed above in connection with FIG. 1. The user interface 200 may be displayed to the user upon launch of the AR application 32, or at another suitable time. The AR application 32 may know the available roles a priori, or may be informed of the available roles by querying the back-end server 14 via web services interface 60. Once a role is selected, the role identification module 40 may send data indicative of the role to the back-end server 14 via web services interface 60. The experience provisioning unit 62, alert generation unit 68, and/or other components of the back-end server 14 may then utilize the selected role to determine appropriate nodes to augment, appropriate types of experiences and/or content to provide for particular nodes, and so on, as discussed above.

Figure 4B:
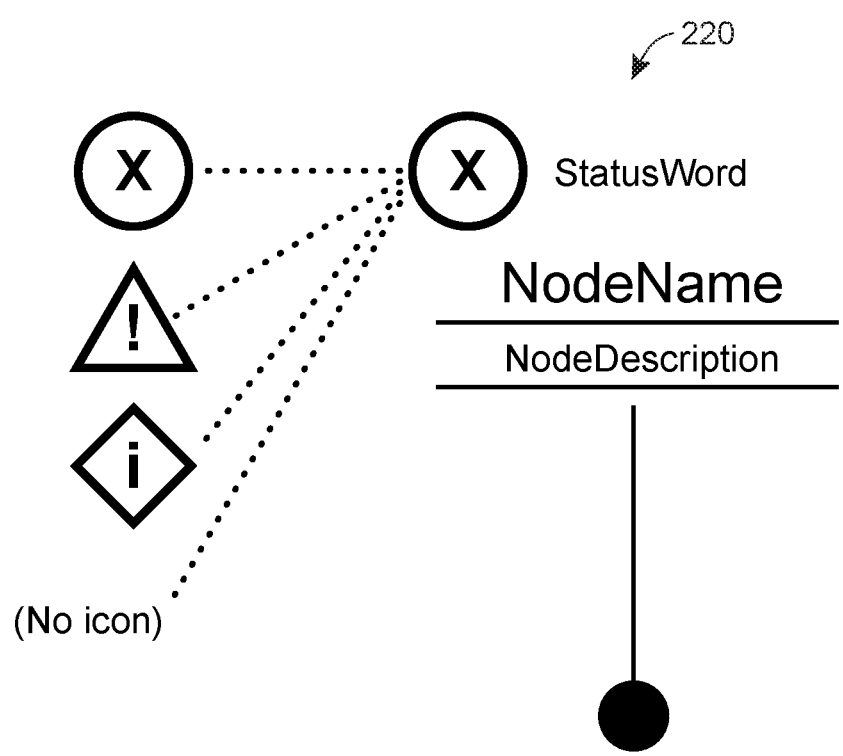

FIG. 4B depicts a user interface 220 that may act as a node marker for each of some or all objects within the user's current field of view (subject to any other criteria, such as proximity or user role). The example user interface 220 includes an icon (circled "X") and descriptor ("Status-Word") that indicate a status of the object/node, a node name (e.g., a device identifier within a process control plant, such as "ESD-3," etc.), a short description of the node (e.g., "emergency shutdown switch," etc.), and a vertical line leading from those pieces of information to a solid-fill circle at that bottom of the user interface 220. The solid-fill circle (or other indicator) may be placed on the {x,y,z} location of the corresponding object within the user's real-world view, e.g., at the real-world {x,y,z} location that the user (or another user) focused upon when adding the node to the 3D map. The text and line may rotate as needed to stay aligned with the vertical axis of the AR mobile device 12 and user, or may always align to the z-axis, for example.

The status icon and descriptor may indicate whether some action should be taken with respect to the object, and/or whether some danger exists with respect to the object. For example, the circled "X" shown in FIG. 4B may correspond to a status of "Critical," the "!" in a triangle may correspond to a status of "Warning," the "i" in a diamond may correspond to a status of "Advisory," and no icon may correspond to a status of "Normal." While FIG. 4B shows a range of possible status icons, it is understood that the user interface 220 only includes, for this particular embodiment and/or scenario, the circled "X" icon. The status depicted for a particular object/node, and the meaning of that status, may vary depending on the user's role.

The node marker (i.e., in FIG. 4B, the text, line, and solid-fill circle) of the user interface 220 may scale in size with distance from the AR mobile device 12, such that nearer objects have larger node markers and more distant objects have smaller node markers. In some embodiments, the user interface 220 includes more information, by way of additional text, additional graphics, and/or color-coding (e.g., red text and line for "Critical" status, green text and line for "Normal" status, etc.), for example.

Figure 4C:
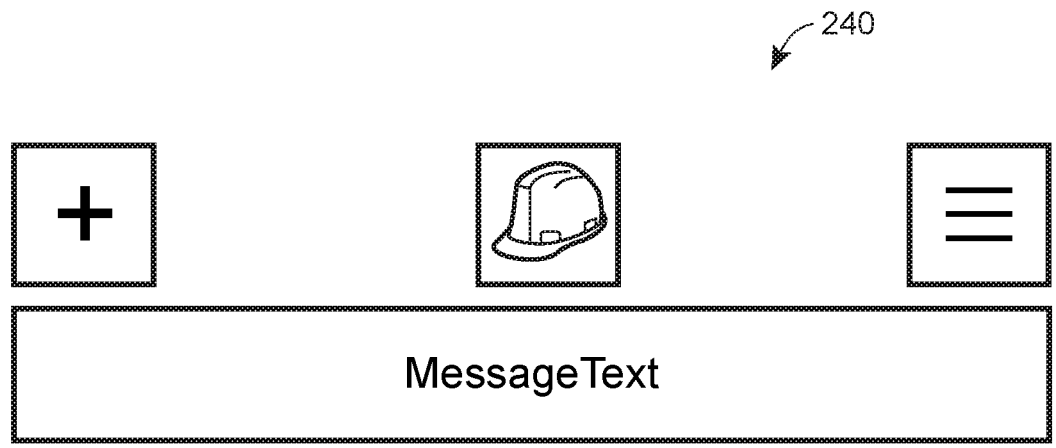

FIG. 4C depicts a user interface 240 that may appear after a user role is selected at user interface 200, or at another suitable time. The "+" icon in the user interface 240 may be selected by the user to add a new node to the 3D map, as discussed above in connection with FIG. 1. The helmet icon may be selected by the user to select a different role, and the third icon may be selected by the user to manage certain settings, as discussed below. The rectangular box in the user interface 240 may display system messages to the user. For example, the message box may be used to display alerts generated by the alert generation unit 68 and/or the position-based alert module 52.

Figure 4D:
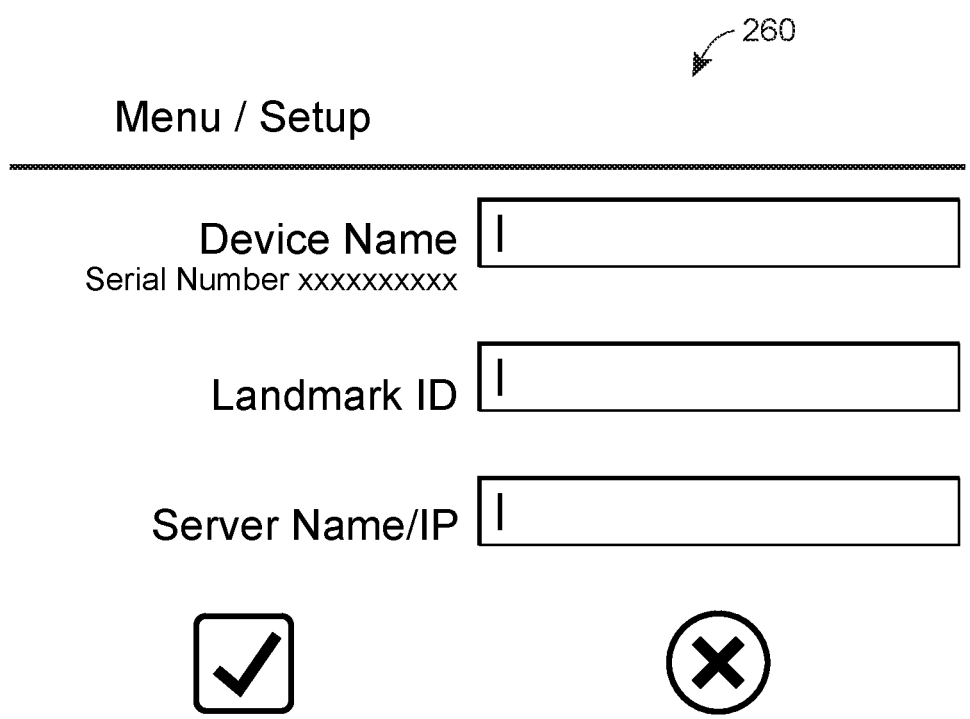

FIG. 4D depicts a user interface 260 that may appear if the user selects the settings icon in the user interface 240. As seen in FIG. 4D, the user interface 260 enables the user to change the name or identifier of the AR mobile device 12, the landmark identifier, and a name or IP address of the back-end server 14. Some or all of these values may be used by the AR mobile device 12 when making web service calls to web services interface 60, for example.

FIG. 4E depicts a simple user interface 280 that may appear if the user selects the "+" (add node) icon in the user interface 240. In this example, the user interface 280 is simply a reticle (e.g., in the center of the user's display 22) that the user may center on any location in the real-world environment simply by looking around (e.g., if the AR mobile device 12 is an AR helmet or goggles, or smart glasses), or by otherwise aiming the camera 24 of the AR mobile device 12 (e.g., if a tablet or smartphone). The node creation module 48 of the AR application 32 may require that the user confirm when the reticle is appropriately placed (e.g., by issuing a voice command), or may assume appropriate placement if the field of view of the camera 24 does not change substantially for some threshold period of time, etc.

FIG. 4F depicts a user interface 300 that may appear after the user has positioned the reticle of the user interface 280, and after the positioning and orientation module 44 has determined the necessary position and/or orientation information for placing the new object/node (e.g., the position of the AR mobile device 12, the orientation of the device 12, and the distance from the device 12 to the object). The example user interface 300 includes a text box for the user to enter a node name and/or node description. Alternatively, some or all of this information may be provided by voice command (e.g., if the user selects the microphone icon). In other embodiments, the node name and/or description may be determined by processing an image of a portion of the object using optical character recognition (OCR) technology. For example, the user may direct the camera 24 towards a tag or label that is affixed to the object and includes a serial number, model number, or other identifier. The identifier may then be sent to the back-end server 14 via web services interface 60 and cross-referenced with information stored at the back-end server 14, or stored in another system or database (e.g., one of the other server(s) 18), to determine the node name and/or description. In still other embodiments, the ML model 65 may be used to predict the object type as discussed above. The predicted type may then be displayed within the user interface 300 (e.g., as text above the text window, or by automatically populating the text window, etc.).

Figure 4G:
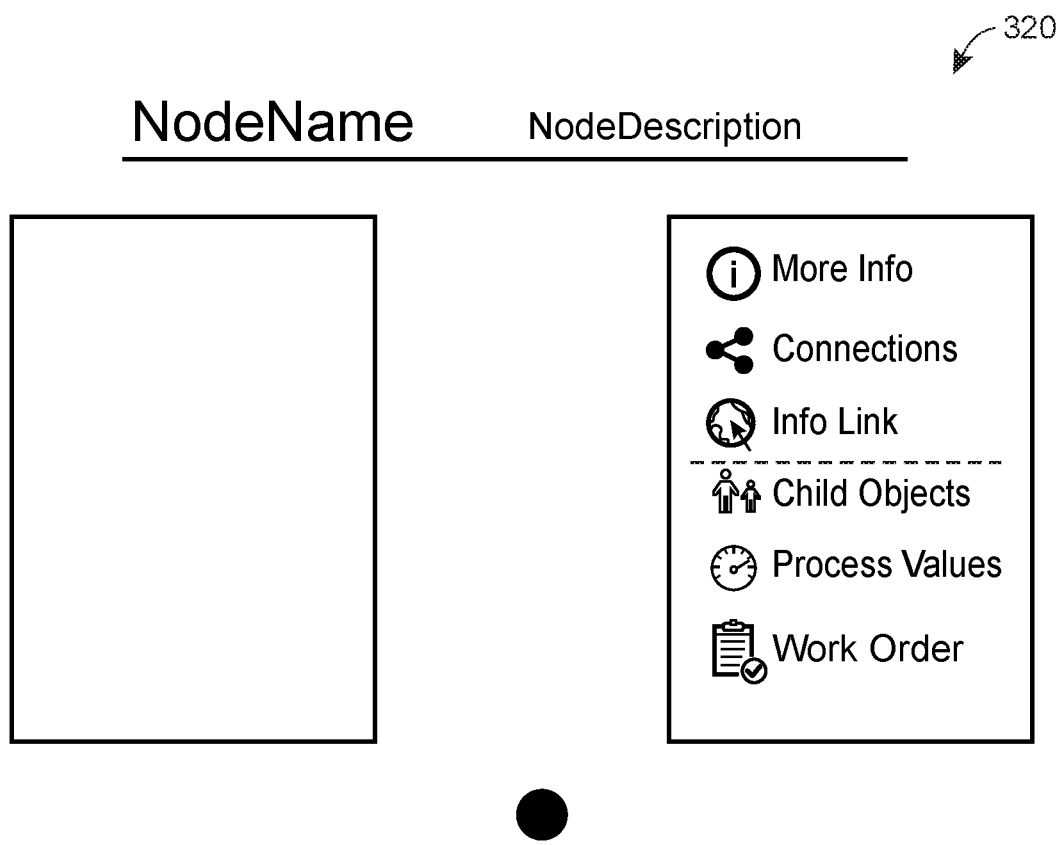

FIG. 4G depicts a user interface 320 that may appear for a specific object/node when the user has selected that object/node (e.g., by selecting the node marker of user interface 220). The user interface 320 may be generated by the node experience module 46, based on data indicative of available experiences for the node that is provided by the experience provisioning unit 62 of the back-end server 14, for example. The example user interface 320 includes the node name and description that were shown on the node marker in the user interface 220, as well as two rectangular areas. The solid-fill circle at the bottom of the user interface 320 may remain at the same position on the object (within the real-world view) that it was at in the user interface 220. A first, "working" area, shown as a blank rectangle in FIG. 4G, may show additional information pertaining to the selected object/node, such as status information for the object, detailed alert information for the object, and so on (e.g., depending upon the type of node experience being provided and/or the user's role).

The user may select the desired type of node experience from the second area, listing those that are available for the node (and possibly, for the user's role). As seen in FIG. 4G, in this example, available node experiences include "More Info" (e.g., to provide additional types of text-based information in the working area), "Connections" (e.g., to show physical or logical connections to other objects/nodes, as discussed below in connection with FIG. 4H), "Info Link" (e.g., to show, in the working area, information from a "help" document, instructional video, or other web page at a particular URL), "Child Objects" (e.g., to show, in the working area, relationships with other objects/nodes that are related as "children" of the selected object/node), "Process Values" (e.g., to show, in the working area, control process values obtained from one of the other server(s) 18 and application(s) 19), and "Work Order" (e.g., to show, in the working area, text of a work order associated with the selected object/node). Other types of experiences are also possible. For example, an additional (or alternative) node experience may be selected to provide interlock information for the node/object, such as the current bypass status of the node/object. Alternatively, such information may be presented within the "More Info" experience discussed above.

Figure 4H:
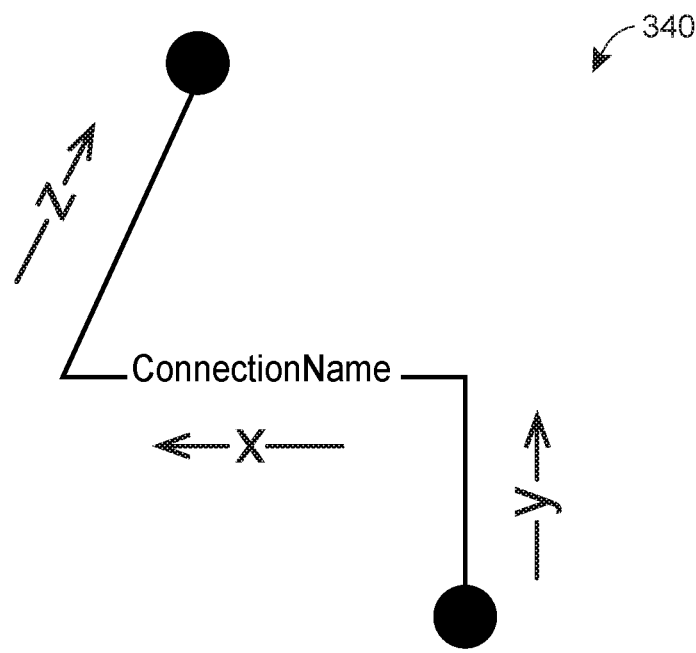

FIG. 4H depicts a user interface 340 that may appear when the user has selected the "Connections" icon in the user interface 320. For the user interface 340, the node experience module 46 renders a line between the $\{x,y,z\}$ position of the currently-selected object/node, and the $\{x,y,z\}$ position of an object/node to which the currently-selected object/node is physically and/or logically connected (e.g., as discussed above in connection with FIG. 1). The solid-fill circle at the bottom of the user interface 340 may be at the former position, while the solid-fill circle at the top of the user interface 340 may be at the latter position. Of course, the relative positions of the solid-fill circles may change depending upon the scenario (e.g., the circle for the selected object/node may appear higher in the real-world view than the circle for the connected object/node).

In the embodiment of FIG. 4H, the node experience module 46 renders the connecting line in three segments: a first segment (starting at the currently-selected object/node) indicating the distance and direction along the y-axis, a second segment (starting at the end of the first segment) indicating the distance and direction along the x-axis, and a third segment (starting at the end of the second segment) indicating the distance and direction along the z-axis and ending at the connected object/node. The line segments may be color-coded, coded by line format (dashed, solid, etc.), and/or coded in other ways to provide additional information (e.g., a red line to indicate a communications connection that is currently inoperative). In other embodiments, the connection may be depicted in a different manner, such as a single line segment between the objects/nodes (e.g., with the line getting wider or narrower to portray distance from the user). In various different embodiments, connections to multiple different objects/nodes can be shown in the user interface 340, or the user may need to select each individual connection for which a visualization is desired.

Example AR Database

Figure 5A:
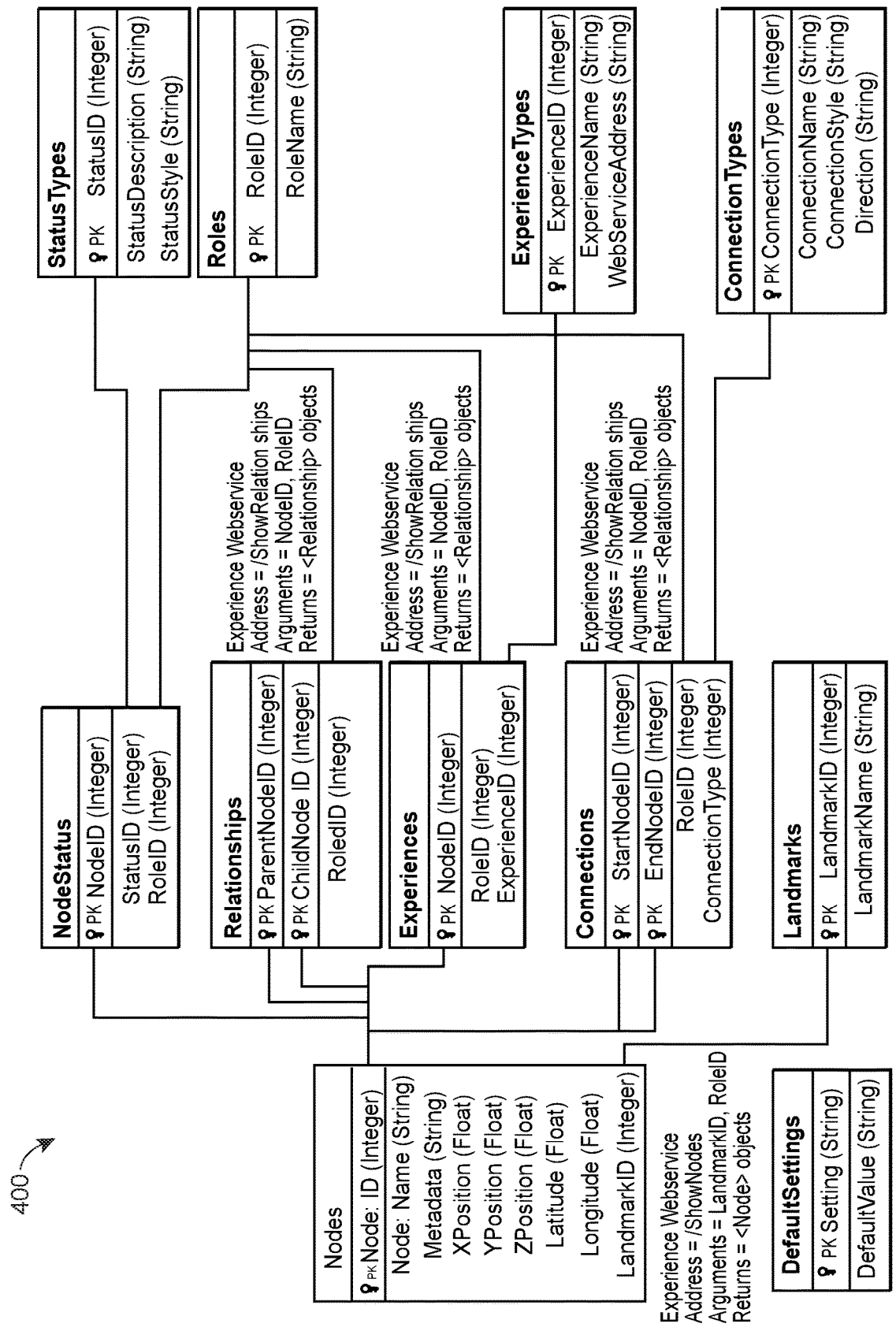

FIGS. 5A and 5B collectively depict a database structure 400 that may be utilized by the AR database 72 of FIG. 1 (e.g., when used in the process control environment 100 of FIG. 2). In the database structure 400, each box represents a table that may be stored in the AR database 72, with the top line of each box being the table name (e.g., "Nodes," "NodeStatus," etc.). The tables are linked using primary keys, each of which is denoted in FIGS. 5A and 5B by a key icon and the letters "PK."

The database structure 400 enables efficient cross-referencing of data items, and permits user and system updates without breaking existing links or requiring extensive updates. For example, using the "Node ID" primary key permits the user to change the "Node Name" for an existing node without the need to update other, related tables. The "GetOPCDA" table in FIG. 5B may correspond to the "Process Values" node experience described above in connection with FIG. 4G.

Example Enhanced Virtual Vision

Figure 7A:
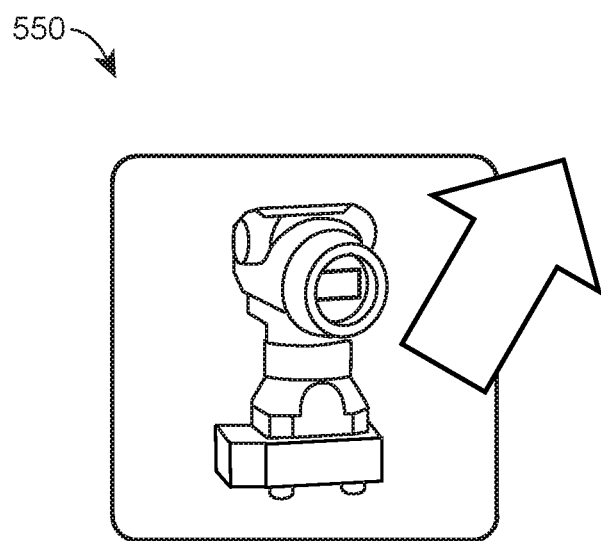
FIGS. 7A and 7B depict example user interfaces that may be superimposed over a field of view provided by an AR mobile device, to provide virtual proximity between a user and an object that is distant from the user or otherwise difficult to access.
Figure 7B:
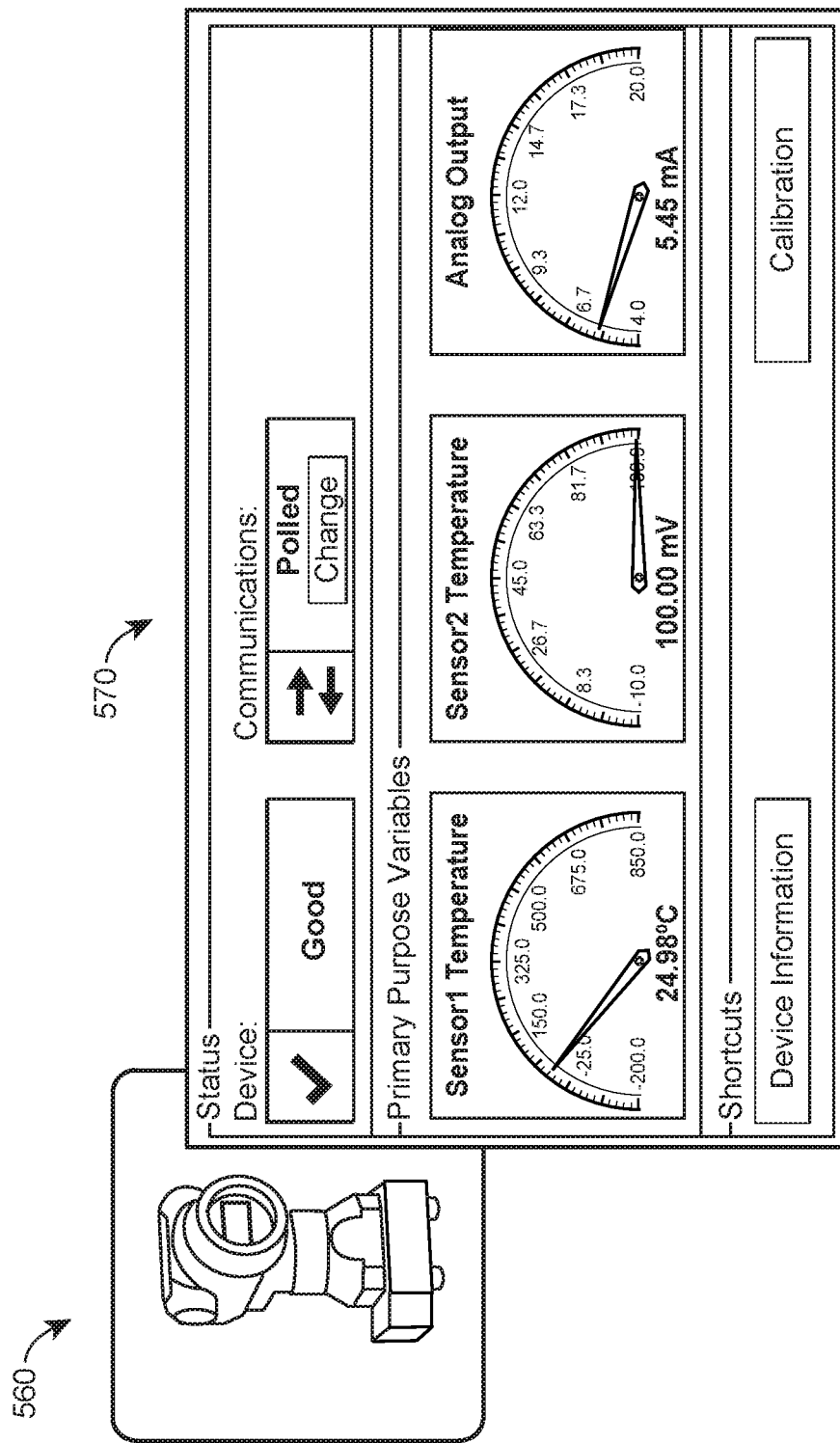

FIGS. 6 and 7 relate to embodiments in which an AR platform (e.g., provided by the AR system 10 of FIG. 1) provides features that enhance the "virtual vision" of the user. FIG. 6 depicts a specific scenario in which a "virtual x-ray vision" feature (discussed above in connection with FIG. 1) is used to "see" into a closed cabinet within a process control environment (e.g., within the process control environment 100 of FIG. 2), while FIGS. 7A and 7B depict a specific scenario in which an "avatar" (also discussed above in connection with FIG. 1) is provided for a sensor/transmitter device that is in a limited access (e.g., hard-to-reach or dangerous) area of the process control environment, and/or is distant from the user's current location.

Referring first to the example of FIG. 6, a closed (and possibly locked) cabinet 500 may contain a number of interior components (not seen in FIG. 6), such as I/O cards, circuit breakers, etc. When any of the criteria discussed above in connection with FIG. 1 are satisfied (e.g., the interior components being within a field of view of the AR mobile device 12 and within a threshold distance, and/or the cabinet 500 being selected by the user, etc.), and if the cabinet 500 is determined to contain obscured objects/nodes (also as discussed above, e.g., based on a known relationship between the cabinet and interior components, and/or by scanning a QR code, etc.), the vision enhancement module 50 of FIG. 1 may superimpose a user interface 520 on the user's real-world view.

The user interface 520 includes a depiction 522 of the interior components. The depiction 522 may be an image of the actual components within the cabinet 500, in their actual arrangement relative to each other. In other embodiments, the depiction 522 includes hyper- or pseudo-realistic graphical representations of the components (e.g., 3D models, 2D models, etc.), either individually or in a manner that depicts their relative arrangement within the cabinet 500. In either case, the depiction 522 may provide the user with an AR experience similar to the experience he or she would have if viewing the actual interior components.

The user interface 520 may be superimposed directly over the cabinet 500 in the user's real-world view, and scaled appropriately so as to align the depiction 522 over the actual positions of the hidden interior components. Alternatively, the user interface 520 may be offset from the cabinet 500 in the user's real-world view, possibly connected by a line or some other means.

The depiction 522 may or may not include node markers (e.g., similar to the user interface 220 of FIG. 4B) for individual ones of the internal components, to the extent that those components have previously been mapped. Moreover, the user interface 520 may enable the user to select various node experiences by selecting such a node marker, by selecting the depiction 522 itself, or by issuing an appropriate voice command. The depiction 522 or user interface 520 may also include a control (e.g., an "X" in one corner) that the user can select to dismiss the depiction 522 from his or her view, or a suitable voice command may be used.

Referring now to FIG. 7A, an direction indicator 550 includes a depiction of a particular object (here, a sensor/transmitter device) along with an arrow showing the general direction of the object relative to the user's real-world view. The vision enhancement module 50 of FIG. 1 may superimpose the direction indicator 550 over the user's real-world view in response to any of the conditions described above (in connection with FIG. 1) with respect to avatars of distant and/or limited-access objects, for example. The depiction of the device in the example direction indicator 550 is a realistic model or image, though of course other formats are also possible (e.g., an outline, animation, video, etc.).

If the user selects the direction indictor 550, the vision enhancement module 50 may superimpose an "avatar" 560 on the user's real-world view, as shown in FIG. 7B. While the avatar 560 shown in FIG. 7B is identical to the depiction of the object in the direction indicator 550, in other embodiments, the avatar 560 is more detailed and/or realistic than the depiction (if any) in the direction indicator 550. Similar to the depiction 522 of FIG. 6, the avatar 560 may provide the user with an AR experience similar to what he or she would have if viewing the actual object (here, sensor/transmitter device) in close proximity. Indeed, as noted above, the virtual x-ray vision feature of FIG. 6 may simply be a special case of the vision enhancement shown in FIG. 7B, with the depiction 522 of FIG. 6 being a collection of avatars for the various components enclosed within the cabinet 510.

If the user selects the avatar 560 or issues an appropriate voice command, the vision enhancement module 50 may superimpose a user interface 570 near to the avatar 560 within the user's real-world view. Alternatively, the user interface 570 may be presented with the avatar 560 by default, without requiring any user selection of the avatar 560 or any voice command. The example user interface 570 of FIG. 7B corresponds to a node experience that provides process values (here, sensor readings), and permits user control of the device (here, by initiating a calibration process). To enable this node experience, the experience provisioning unit 62 of FIG. 1 may communicate with one or more of the application(s) 19 run by the other server(s) 18, as discussed above. For example, the experience provisioning unit 62 may cause a process control application to launch, or interface with an executing process control application using an API, etc.

Example 3D Mapping Method

Figure 8:
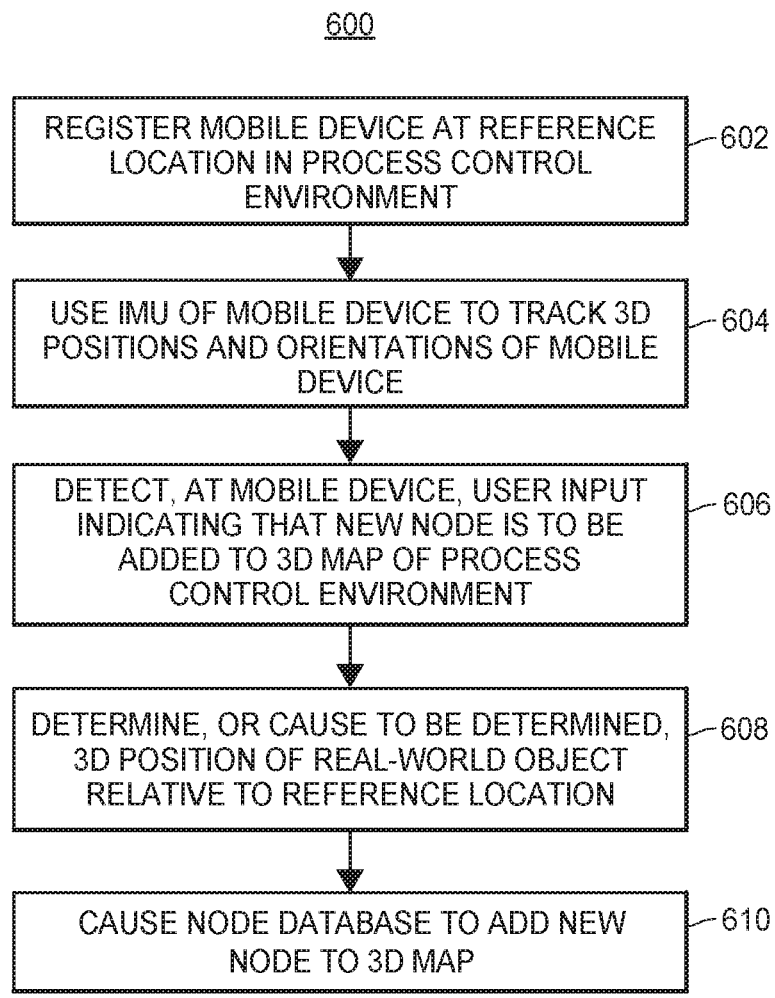
FIG. 8 is a flow diagram of an example method for mapping a real-world process control environment using a mobile device.

FIG. 8 depicts an example method 600 for mapping a real-world process control environment (e.g., process control environment 100 of FIG. 2) using a mobile device. The method 600 may be performed using the AR mobile device 12 of FIG. 1, for example, or another suitable mobile device. In some embodiments, a mobile device without AR capability may be used.

At block 602, the mobile device is registered at a reference or "landmark" location in the process control environment. The registration may include using a camera of the mobile device (e.g., camera 24 of FIG. 1) to scan a visual representation of a code (e.g., a QR code or other image) located at the reference location. The code may be on a wall (e.g., on a plate or poster), for example.

At block 604, at least an IMU of the mobile device (e.g., the IMU 26 of FIG. 1) is used to track 3D positions of the mobile device relative to the reference location, and to track orientations of the mobile device, as the mobile device is moved through the process control environment by the user. Block 604 may continue indefinitely (e.g., simultaneously with blocks 606 through 610), until the user ends the AR experience (e.g., by powering down the mobile device, or closing an application running on the mobile device, etc.). The tracking at block 604 may also use the mobile device camera. For example, VIO technology may be used to track the position and orientation of the mobile device.

At block 606, a user input, indicating that a new node is to be added to a 3D map of the process control environment, is detected at the mobile device. The user input may be a user voice command (e.g., "Add Node"), or a user selection of a menu option (e.g., by focusing the mobile device camera on a particular location, or entering data on a keyboard or touch screen), for example.

At block 608, a 3D position of a real-world object (relative to the reference location) is determined, or caused to be determined, based at least on a tracked 3D position of the mobile device and a tracked orientation of the mobile device. In one embodiment, block 608 includes capturing an image of a real-world object using the mobile device's camera (e.g., at the time the user input was entered, or shortly thereafter). The distance between the mobile device and the object may then be determined from the image, at least by processing the camera image using a depth sensing technique. The 3D position may then be determined, or caused to be determined, based on the tracked 3D position and orientation of the mobile device, as well as the determined distance.

In some embodiments, the 3D position of the object is directly determined at block 608 by the device, system, etc., that performs the method 600. In other embodiments, the device, system, etc., that performs the method 600 causes another device, system, etc., to determine the 3D position of the object, e.g., by making a request via a web services interface (e.g., web services interface 60 of FIG. 1).

At block 610, a node database or library is caused to add the new node to the 3D map, at least by causing the 3D position of the object to be stored in association with the new node. Block 610 may include using a web services interface to cause a remote server (e.g., back-end server 14 of FIG. 1) to store at least the 3D position of the new node in the node database (e.g., AR database 72 of FIG. 1), for example.

The method 600 may include one or more blocks not shown in FIG. 8. For example, the method 600 may include a block in which another user input (e.g., voice command, keyboard entry, etc.) is received at the mobile device, with the user input indicating an identifier (e.g., name) and/or description of the new node. In such an embodiment, block 610 may further include causing the identifier and/or description of the new node to be stored in association with the new node, within the node database.

As another example, the method 600 may include additional blocks corresponding to later operations of a different mobile device (or later operations by the same mobile device performing the blocks 602 through 610), which navigates an area of the process control environment after the new node has been added to the 3D map. In a first block, for example, a second mobile device (e.g., AR mobile device 12 or a similar device) may be registered at the reference location. Thereafter, 3D positions of the second mobile device (relative to the reference location) and orientation of the second mobile device may be tracked using at least an IMU of the second mobile device (e.g., using VIO technology). A triggering condition may then be detected, by determining (e.g., based on a tracked orientation of the second mobile device) that the object is within an area inside a field of view of a camera of the second mobile device, and/or determining (e.g., based on a tracked position of the second mobile device), that the physical object is proximate to the second mobile device, for example. In response to detecting the triggering condition, digital information associated with the new node may be superimposed on a real-world view seen on or through a display of the second mobile device (e.g., a node marker, or in accordance with any node experience discussed above).

Example Method for Providing Virtual X-Ray Vision

Figure 9:
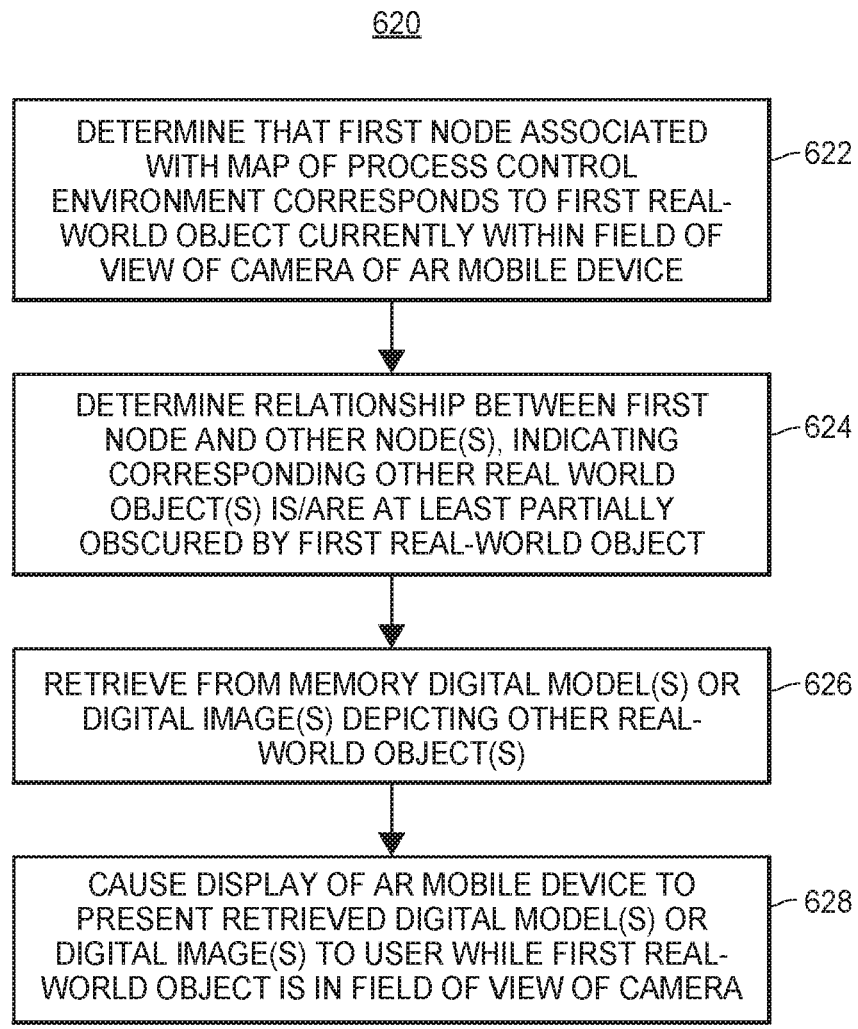
FIG. 9 is a flow diagram of an example method for providing virtual enhanced vision to a user of an AR mobile device in a real-world process control environment.

FIG. 9 depicts an example method 620 for providing virtual enhanced vision (e.g., virtual "x-ray vision") to a user of an AR mobile device in a real-world process control environment (e.g., the process control environment 100 of FIG. 2). The method 620 may be performed by one or more processors of a computing system or device, such as the back-end server 14 of FIG. 1, and/or an AR mobile device such as the AR mobile device 12 of FIG. 1, for example.

At block 622, it is determined that a particular node ("first node"), associated with a map of the process control environment, corresponds to a particular real-world object ("first object") that is currently within the field of view of a camera of the AR mobile device (e.g., camera 24 of FIG. 1). The first object may be any device shown or described in connection with FIG. 2, for example, or any other physical thing that is at least partially opaque. In some embodiments, the first object is an enclosure, such as a cabinet configured to contain a number of smaller devices or components.

In some embodiments, block 622 includes detecting a current orientation of the AR mobile device, and determining, based on the current orientation of the AR mobile device, and further based on the position of the first node as indicated by the map, that the first object is currently within the field of view of the camera. Block 622 may also include determining that the first object is within some threshold distance of the AR mobile device (e.g., 10 meters, 50 meters, etc.) based on the current position of the AR mobile device and the first node position.

At block 624, a specific relationship, between the first node and one or more other nodes that are also associated with the map, is determined. The relationship indicates (explicitly or implicitly) that one or more other real-world objects, corresponding to the one or more other nodes, is/are at least partially obscured by the first object. For example, a node database (e.g., AR database 72, or a portion thereof) may store data indicating that the first node corresponds to a cabinet or other enclosure that contains the object(s) corresponding to the other node(s) (e.g., controllers, I/O cards, switches, etc.), and block 624 may include accessing the node database directly (e.g., in a local memory) or via another computing system. In some embodiments, the first object is marked with a QR code or other visual code, and block 624 includes both scanning the code to determine a node identifier, and using the node identifier to determine the relationship (e.g., by using the identifier as a key to a database).

At block 626, one or more digital models or digital images are retrieved from memory (e.g., a local or remote persistent memory), with the model(s) or image(s) depicting the object(s) that is/are at least partially obscured by the first object. For example, one or more hyper-realistic or pseudo-realistic 3D models, 2D models, animated models, digital images, or digital video of the object(s) may be retrieved from the memory.

At block 628, a display of the AR mobile device (e.g., the display 22 of FIG. 1) is caused to present the retrieved model(s) or image(s) to the user while the first object is still in the field of view of the camera. For example, the model(s) or image(s) may be superimposed on a real-world view that is presented to the user on the display or seen by the user through the display. Block 628 may include transmitting at least some of the display content, and/or transmitting display instructions, to the AR mobile device (e.g., via web services interface 60 of FIG. 1), for example.

The method 620 may include one or more blocks not shown in FIG. 9. For example, the method 620 may include a block in which one or more node experiences are presented to the user for the obscured objects (e.g., initially with the model(s) or image(s), or in response to a further action, such as a user selection of the model or image of a particular obscured object).

Example Method for Visualizing Limited-Access Objects

Figure 10:
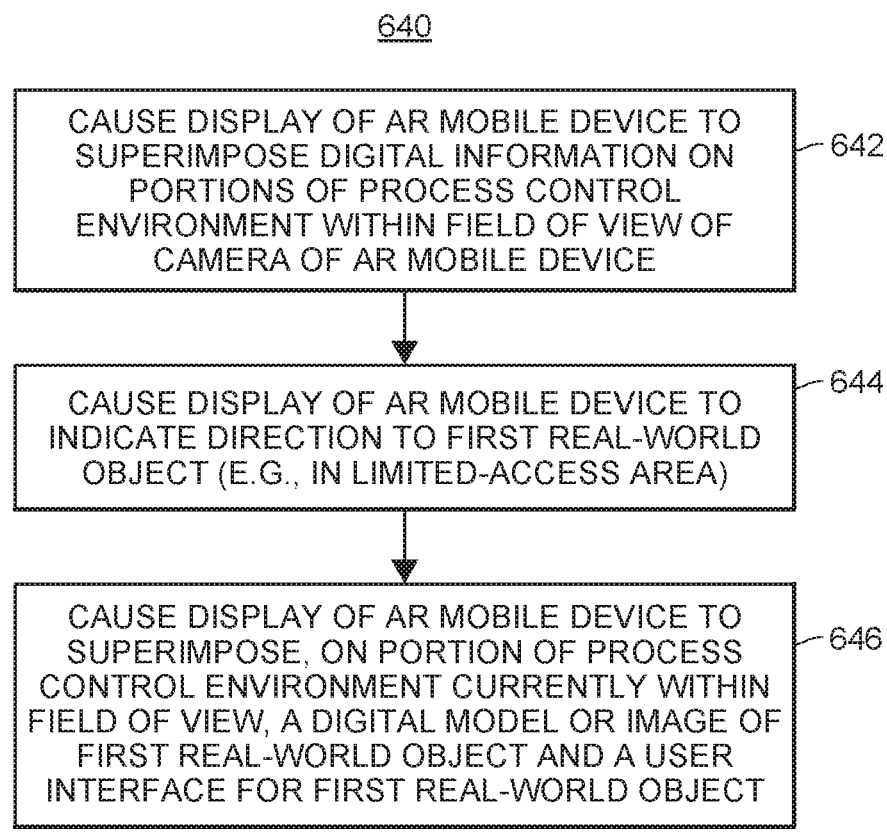
FIG. 10 is a flow diagram of an example method for facilitating interaction between a user of an AR mobile device and a real-world object that may be in a distant or limited-access area of a process control environment.

FIG. 10 depicts an example method 640 for facilitating interaction between a user of an AR mobile device and a real-world object ("first object") that may be in a limited-access (e.g., dangerous, barricaded, etc.) area of a process control environment (e.g., the process control environment 100 of FIG. 2). The method 640 may be performed by one or more processors of a computing system or device, such as the back-end server 14 of FIG. 1, and/or an AR mobile device such as the AR mobile device 12 of FIG. 1, for example.

At block 642, a display of the AR mobile device (e.g., the display 22 of FIG. 1) is caused, as the user moves through the process control environment, to superimpose digital information on portions of the environment that are within the field of view of a camera of the AR mobile device (e.g., the camera 24 of FIG. 1). The superimposed information is associated with nodes in a map (e.g., 3D map) of the process control environment, with the nodes corresponding to other real-world objects in the environment. Block 642 may include transmitting at least some of the display content, and/or transmitting display instructions, to the AR mobile device (e.g., via web services interface 60 of FIG. 1), for example.

At block 644, the display of the AR mobile device is caused to indicate a direction to the first object while the first object is not within the field of view of the camera. The indication may comprise text, an arrow, a line, and/or an animation, for example. Similar to block 642, block 644 may include transmitting at least some of the display content, and/or transmitting display instructions, to the AR mobile device (e.g., via web services interface 60 of FIG. 1), for example.

At block 646, after detecting a user input that was made via the AR mobile device and indicates selection of the first object (e.g., a voice command requesting a user interface for the first object), the display is caused to superimpose, on a portion of the process control environment that is currently within the field of view but does not include the first object, a digital model or image of the first object (i.e., an "avatar" of the first object), as well as a user interface for the first object. The avatar may be a hyper-realistic or pseudo-realistic 3D model, 2D model, animated model, digital image, or digital video of the object, for example. The user interface may include one or more virtual controls enabling user control of the first object (e.g., to calibrate the first object, set operational parameters of the first object, etc.), and/or one or more displays presenting information associated with status (e.g., diagnostic status, maintenance status, operational status, etc.), settings, and/or outputs (e.g., sensor readings, etc.) of the first object. In some embodiments, the user interface is not presented at the same time as the avatar, and instead appears (along with the avatar) in response to a user selection of the avatar or voice command.

In some embodiments, the indication of direction at block 644 occurs before detecting the user input indicating selection of the first object (i.e., the sequence shown in FIG. 10). In some such embodiments, the direction indicator (e.g., an arrow pointing towards an off-display area containing the first object) may be generated and displayed in response to detecting (1) that the first object is within a threshold distance of the AR mobile device, and (2) that the first object is not currently within the field of view of the camera. Other suitable triggers or criteria for the direction indicator are also possible. For example, the indicator may only be provided to users having a certain user role that is relevant to the first object.

In other embodiments, the indication of direction instead occurs after detecting the user input that had indicated the selection of the first object. For example, the user may issue a voice command requesting that a user interface be retrieved for the first object (e.g., a user "search" for the first object), after which the direction indicator (and possibly avatar) is superimposed on the user's real-world view.

The digital model or image, whether displayed with the direction indicator and/or at a subsequent stage, may be retrieved from a database using a web services interface (e.g., from the AR database 72 of FIG. 1 using the web services interface 60).

Figure 11:
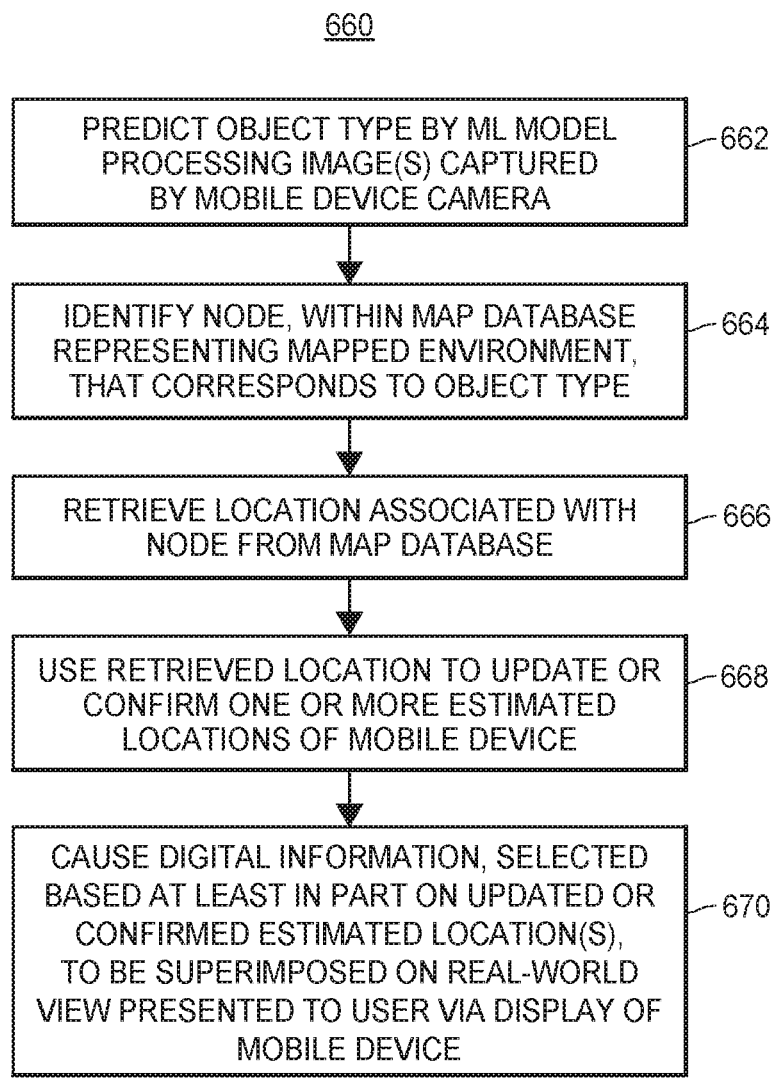
FIG. 11 is a flow diagram of an example method for increasing the accuracy of AR information presented to a user navigating a real-world, mapped environment.

Example Method for Increasing Accuracy of AR Information Presented to a Navigating User FIG. 11 depicts an example method 660 for increasing accuracy of AR information presented to a user navigating a real-world, mapped environment (e.g., the process control environment 100 of FIG. 2). The method 660 may be performed by one or more processors of a computing system or device, such as the back-end server 14 of FIG. 1, and/or an AR mobile device such as the AR mobile device 12 of FIG. 1, for example.

At blocks 662 and 664, as the user of a mobile device (e.g., the AR mobile device 12 of FIG. 1) moves through the mapped environment, a specific object within the field of view of a camera of the mobile device is identified. Identifying the specific object includes predicting an object type at block 662, and identifying a node that corresponds to the object type at block 664. The object type is predicted at block 662 using a machine learning (ML) model processing one or more images captured by the mobile device camera, and the node is identified at block 664 from within a map database representing the mapped environment (e.g., the AR database 72 of FIG. 1). The ML model may be implemented by the mobile device, and/or by a remote server that is communicatively coupled to the mobile device, for example. The ML model is a model that was trained to process images to recognize object types, such as the ML model 65 of FIG. 1, for example.

Block 664 may include identifying a node within the map database that both corresponds to the predicted object type, and is also within a threshold distance of an estimated location of the mobile device (e.g., as estimated location determined using the IMU 26 of FIG. 1) and/or the node having a stored location that is closest to the estimated mobile device location (e.g., as compared to other nodes having the same object type). In some embodiments, the identified node is one that is also offset from the estimated location of the mobile device in a direction that allows an object corresponding to the node to be within the field of view of the camera while the mobile device is in a particular orientation (e.g., the orientation as determined using the IMU 26 of FIG. 1).

At block 666, a location associated with the node is retrieved from the map database, and at block 668, the retrieved location is used to update or confirm one or more estimated locations of the mobile device. Block 666 may include calculating a difference between the retrieved location of the node and an estimated location of the mobile device (e.g., the location determined using the IMU 26), and using the calculated difference to adjust the estimated location of the mobile device, for example.

At block 670, digital information is caused to be superimposed on a real-world view presented to the user via a display of the mobile device (e.g., the display 22 of FIG. 1). The digital information includes information selected based at least in part on the estimated location(s) of the mobile device, as updated or confirmed at block 668. The digital information may be selected based on the estimated location(s) in any of the ways discussed above (e.g., comparing the device location, along with device orientation, to node locations within an AR database such as AR database 72, and retrieving information for various nodes from the AR database as needed), for example. Block 670 may include transmitting the digital information to the mobile device using a particular data protocol or command, and/or may include generating the display view that includes the digital information, for example.

In some embodiments, the method 660 includes a first additional block (not shown in FIG. 11) in which an actual distance between the mobile device and the specific object is determined (e.g., by processing at least one of the camera images depicting the object), and a second additional block (also not shown in FIG. 11) in which an orientation of the mobile device is determined (e.g., using the IMU 26). In such an embodiment, block 668 may include using the retrieved location of the node, the determined actual distance between the mobile device and the specific object, and the determined orientation of the mobile device to update or confirm the estimated location(s) of the mobile device.

Example Method for Facilitating Map Creation

Figure 12:
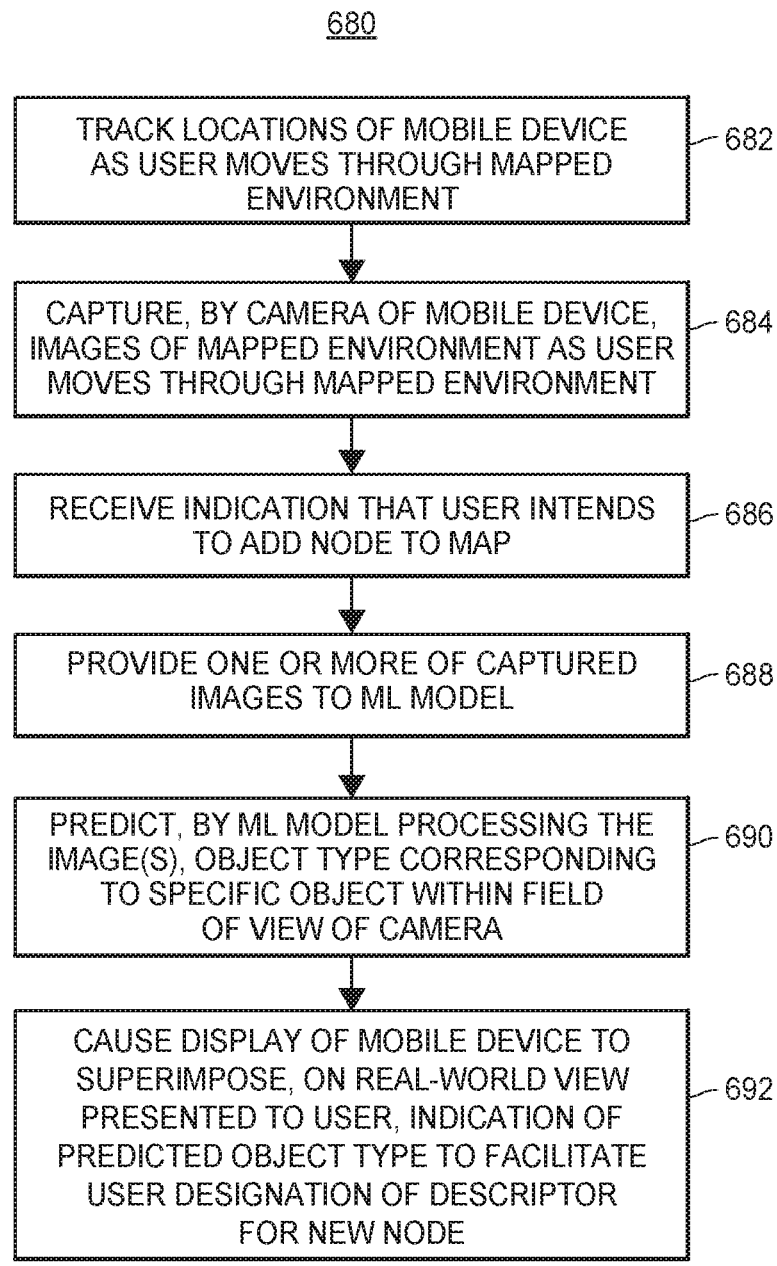
FIG. 12 is a flow diagram of an example method for facilitating creation of a map of a real-world, process control environment.

FIG. 12 depicts an example method 680 for facilitating creation of a map of a real-world, process control environment (e.g., the process control environment 100 of FIG. 2). The method 680 may be performed by one or more processors of a computing system or device, such as the back-end server 14 of FIG. 1, and/or an AR mobile device such as the AR mobile device 12 of FIG. 1, for example.

At block 682, locations of a mobile device (e.g., the AR mobile device 12 of FIG. 1) are tracked as the user of the mobile device moves through the mapped environment. Block 682 may include tracking the mobile device locations using an inertial measurement unit of the mobile device (e.g., the IMU 26 of FIG. 1), and movement may be tracked relative to a previously known location of the mobile device (e.g., a landmark location) as discussed above.

At block 684, images of the mapped environment are captured by a camera of the mobile device (e.g., the camera 24 of FIG. 1) as the user moves through the mapped environment. Block 684 occurs at least partially in parallel/simultaneously with block 682, such that at least some of the images are associated with specific, tracked mobile device locations.

At block 686, an indication that the user intends to add a node to the map is received. Block 686 may include receiving an indication that the user entered a particular command via the mobile device (e.g., a voice command such as "add node"), for example, or may include detecting that a reticle of the mobile device display has been centered on the same target for some threshold amount of time (e.g., 3 seconds), etc.

At block 688, one or more of the captured images are provided to a machine learning (ML) model. The ML model may be implemented by the mobile device, and/or by a remote server that is communicatively coupled to the mobile device, for example. The ML model is a model that was trained to process images to recognize object types, such as the ML model 65 of FIG. 1, for example.

At block 690, an object type, corresponding to a specific object within a field of view of the camera, is predicted by the ML model as the ML model processes the one or more images. In some embodiments, multiple, "candidate" object types are predicted at block 690, where each candidate object type is one that potentially corresponds to the specific object.

At block 692, a display of the mobile device is caused to superimpose, on a real-world view presented to the user, an indication of the predicted object type to facilitate the user's designation of a descriptor for the new node. Block 692 may include transmitting the predicted object type to the mobile device using a particular data protocol or command, and/or may include generating the display view that includes the indication of the predicted object type, for example. In some embodiments where block 690 includes predicting multiple, candidate object types, block 692 includes causing the mobile device display to superimpose an indication of each candidate object type on the real-world view presented to the user (e.g., in ranked order based on confidence level).

Example Method for Updating Node Locations

Figure 13:
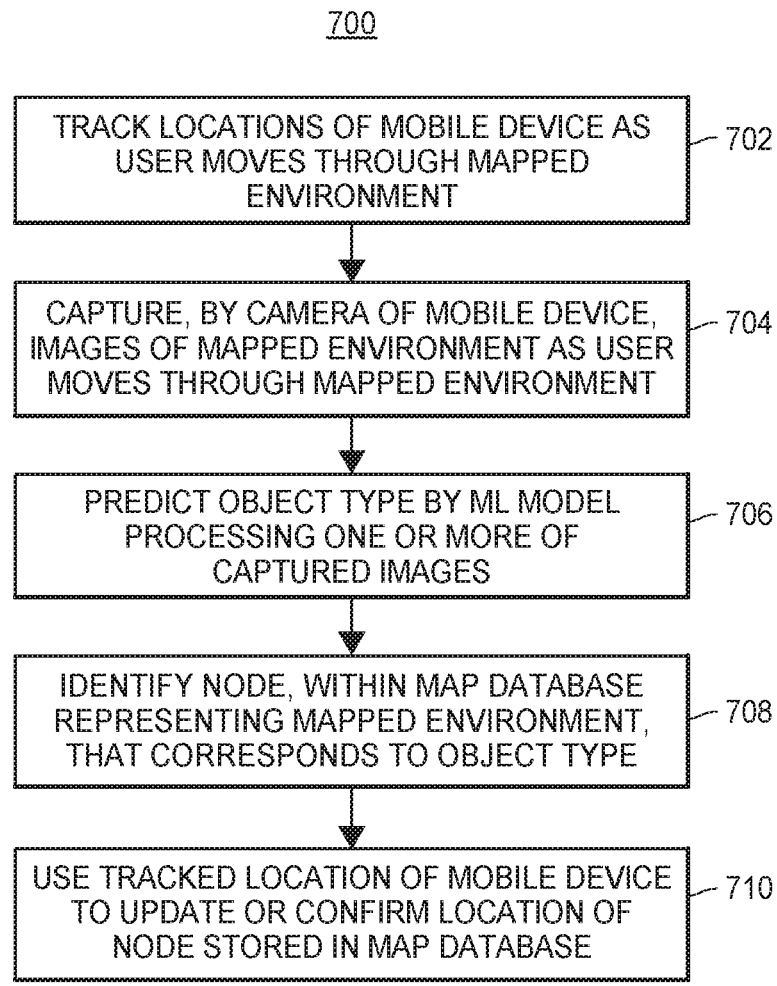
FIG. 13 is a flow diagram of an example method for updating node locations in a real-world, mapped environment.

FIG. 13 depicts an example method 700 for updating node locations in a real-world, mapped environment (e.g., the process control environment 100 of FIG. 2). The method 700 may be performed by one or more processors of a computing system or device, such as the back-end server 14 of FIG. 1, and/or an AR mobile device such as the AR mobile device 12 of FIG. 1, for example.

At block 702, locations of a mobile device (e.g., the AR mobile device 12 of FIG. 1) are tracked as the user of the mobile device moves through the mapped environment. Block 702 may include tracking the mobile device locations using an inertial measurement unit of the mobile device, such as the IMU 26 of FIG. 1, for example, and movement may be tracked relative to a previously known location of the mobile device (e.g., a landmark location) as discussed above.

At block 704, images of the mapped environment are captured by a camera of the mobile device (e.g., the camera 24 of FIG. 1) as the user moves through the mapped environment. Block 704 occurs at least partially in parallel/simultaneously with block 702, such that at least some of the images are associated with specific, tracked mobile device locations.

At blocks 706 and 708, a specific object within a field of view of the camera of the mobile device is identified. Identifying the specific object includes predicting an object type at block 706, and identifying a node that corresponds to the object type at block 708. The object type is predicted at block 706 using a machine learning (ML) model processing one or more images captured by the mobile device camera, and the node is identified at block 708 from within a map database representing the mapped environment (e.g., the AR database 72 of FIG. 1). The ML model may be implemented by the mobile device, and/or by a remote server that is communicatively coupled to the mobile device, for example. The ML model is a model that was trained to process images to recognize object types, such as the ML model 65 of FIG. 1, for example.

At block 710, a tracked location of the mobile device is used to update or confirm a location, stored in the map database, of the node that was identified at block 708. In some embodiments, the node location is updated or confirmed based not only on the tracked location of the mobile device, but also based on the tracked locations of a number of other mobile devices. For example, the node location may be updated when the tracked locations from a threshold number (e.g., 10) of mobile devices generally are in agreement with each other, but disagree with the initial stored node location.

In some embodiments, the method 700 includes a first additional block (not shown in FIG. 13) in which an actual distance between the mobile device and the specific object is determined (e.g., by processing at least one of the camera images depicting the object), and a second additional block (also not shown in FIG. 13) in which an orientation of the mobile device is determined (e.g., using the IMU 26). In such an embodiment, block 710 may include using the tracked location of the mobile device, the determined actual distance between the mobile device and the specific object, and the determined orientation of the mobile device to update or confirm the node location.

General Considerations

When implemented in software, any of the applications and functions described herein may be stored as instructions in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for increasing accuracy of augmented reality (AR) information presented to a user navigating a real-world, mapped process plant environment, the method comprising:
    registering, at a server containing a map database, a mobile device of the user at a landmark within the mapped process plant environment;
    in response to registering at the landmark, transmitting, from the server, an authorization to gain physical access to the mapped process plant environment;
    identifying, as the user moves through the mapped process plant environment, a specific object within a field of view of a camera of the mobile device, wherein identifying the specific object includes:
        predicting, by a machine learning (ML) model processing one or more images captured by the camera, one or more object types, and
        identifying a respective node, of a plurality of nodes within the map database representing the mapped process plant environment, that corresponds to a respective object type for each of the one or more object types, wherein at least some nodes of the plurality of nodes represent field devices within the process plant environment, and wherein a first respective node corresponds to the specific object;
    retrieving, from the map database, a location associated with the first respective node;
    using the retrieved location to update or confirm one or more estimated locations of the mobile device; and
    causing digital information including each of the one or more object types and an avatar of the first respective node to be superimposed on a real-world view presented to the user via a display of the mobile device, the digital information being selected based at least in part on the updated or confirmed one or more estimated locations of the mobile device, and the digital information including alert information corresponding to the specific object, and wherein selection of the avatar enables the user to control operation of the specific object by issuing a voice command.

2. The method of claim 1, wherein identifying the respective node includes:
    identifying a node, within the map database, that corresponds to one of the one or more object types and is within a threshold distance of an estimated location of the mobile device, the estimated location being determined by an inertial measurement unit of the mobile device.

3. The method of claim 1, wherein identifying the respective node includes:
    identifying a node, within the map database, that (i) corresponds to one of the one or more object types, (ii) is within a threshold distance of an estimated location of the mobile device, and (iii) is offset from the estimated location of the mobile device in a direction that allows an object corresponding to the node to be within the field of view of the camera while the mobile device is in a particular orientation, the estimated location and the particular orientation being determined using an inertial measurement unit of the mobile device.

4. The method of claim 1, wherein using the retrieved location of the first respective node to update or confirm one or more estimated locations of the mobile device includes:
    calculating a difference between the retrieved location of the first respective node and an estimated location of the mobile device, the estimated location being determined using an inertial measurement unit of the mobile device; and
    using the calculated difference to adjust the estimated location of the mobile device.

5. The method of claim 1, further comprising:
    determining an actual distance between the mobile device and the specific object; and
    determining an orientation of the mobile device,
    wherein using the retrieved location of the first respective node to update or confirm the one or more estimated locations of the mobile device includes using (i) the retrieved location of the first respective node, (ii) the actual distance between the mobile device and the specific object, and (iii) the orientation of the mobile device to update or confirm the one or more estimated locations.

6. The method of claim 5, wherein determining an actual distance between the mobile device and the specific object includes determining the actual distance by processing at least one of the one or more images captured by the camera.

7. The method of claim 5, wherein determining an orientation of the mobile device includes determining the orientation using data generated by an inertial measurement unit of the mobile device.

8. The method of claim 1, wherein identifying the specific object within the field of view of the camera is performed at least in part by a server that is communicatively coupled to the mobile device.

9. The method of claim 1, wherein identifying the specific object within the field of view of the camera is performed at least in part by the mobile device.

10. A system for presenting accurate augmented reality (AR) information to a user navigating a real-world, mapped process plant environment, the system comprising:
a mobile device of the user, the mobile device including a camera and a display; and
a server that is communicatively coupled to the mobile device,
wherein the mobile device is configured to use the camera to capture images of the mapped process plant environment as the user moves through the mapped process plant environment,
wherein the mobile device and/or the server is configured to:
register the mobile device at a landmark within the mapped process plant environment,
in response to registering at the landmark, transmit an authorization to gain physical access to the mapped process plant environment,
identify a specific object within a field of view of the camera, at least in part by (i) predicting, by a machine learning (ML) model processing one or more images captured by the camera, one or more object types, and (ii) identifying a respective node, of a plurality of nodes within a map database representing the mapped process plant environment, that corresponds to a respective object type for each of the one or more object types, wherein at least some nodes of the plurality of nodes represent field devices within the process plant environment, and wherein a first respective node corresponds to the specific object,
retrieve, from the map database, a location associated with the first respective node,
use the retrieved location to update or confirm one or more estimated locations of the mobile device, and
cause digital information including each of the one or more object types and an avatar of the first respective node to be superimposed on a real-world view presented to the user via the display of the mobile device, the digital information being selected based at least in part on the updated or confirmed one or more estimated locations of the mobile device, and the digital information including alert information corresponding to the specific object, and wherein selection of the avatar enables the user to control operation of the specific object by issuing a voice command.

11. The system of claim 10, wherein the mobile device includes an inertial measurement unit, and wherein the mobile device and/or the server is configured to identify a node, within the map database, that (i) corresponds to one of the one or more object types, (ii) is within a threshold distance of an estimated location of the mobile device, and (iii) is offset from the estimated location of the mobile device in a direction that allows an object corresponding to the node to be within the field of view of the camera while the mobile device is in a particular orientation, the estimated location and the particular orientation being determined using the inertial measurement unit.

12. The system of claim 10, wherein the mobile device and/or the server is further configured to:
determine an actual distance between the mobile device and the specific object; and
determine an orientation of the mobile device, and
wherein the mobile device and/or the server is configured to use the retrieved location of the first respective node to update or confirm the one or more estimated locations of the mobile device at least by using (i) the retrieved location of the first respective node, (ii) the actual distance between the mobile device and the specific object, and (iii) the orientation of the mobile device to update or confirm the one or more estimated locations.

13. A method for updating node locations in a real-world, mapped process plant environment, the method comprising:
registering, at a server containing a map database, a mobile device of the user at a landmark within the mapped process plant environment;
in response to registering at the landmark, transmitting, from the server, an authorization to gain physical access to the mapped process plant environment;
tracking locations of the mobile device as the user moves through the mapped process plant environment;
capturing, by a camera of the mobile device, images of the mapped process plant environment as the user moves through the mapped process plant environment;
identifying a specific object within a field of view of the camera, wherein identifying the specific object includes:
predicting, by a trained machine learning (ML) model processing one or more of the captured images, one or more object types, and
identifying a respective node, of a plurality of nodes within the map database representing the mapped process plant environment, that corresponds to a respective object type for each of the one or more object types, wherein at least some nodes of the plurality of nodes represent field devices within the process plant environment, and wherein a first respective node corresponds to the specific object,
determining a location of the first respective node;
causing digital information including an avatar of the first respective node to be superimposed on a real-world view presented to the user, wherein the digital information includes alert information corresponding to the specific object, and wherein selection of the avatar enables the user to control operation of the specific object by issuing a voice command;
receiving a confirmation corresponding to the first respective node of the plurality of nodes;
using a tracked location of the mobile device to update or confirm the location of the first respective node stored in the map database; and
further training the trained ML model based upon (i) the one or more of the captured images and (ii) the confirmation corresponding to the first respective node.

14. The method of claim 13, wherein using the tracked location of the mobile device to update or confirm the location of the first respective node stored in the map database includes:
using (i) the tracked location of the mobile device, and (ii) tracked locations of one or more other mobile devices, to update or confirm the location of the first respective node stored in the map database.

15. The method of claim 13, wherein tracking locations of the mobile device as the user moves through the mapped process plant environment includes tracking the locations of the mobile device using an inertial measurement unit of the mobile device.

16. The method of claim 13, further comprising:
   determining an actual distance between the mobile device and the specific object; and
   determining an orientation of the mobile device,
   wherein using the tracked location of the mobile device to update or confirm the location of the first respective node stored in the map database includes using (i) the tracked location of the mobile device, (ii) the actual distance between the mobile device and the specific object, and (iii) the orientation of the mobile device to update or confirm the location of the first respective node stored in the map database.

17. The method of claim 13, wherein the confirmation corresponding to the first respective node is a user confirmation corresponding to the first respective node.

\* \* \* \* \*